(12) United States Patent
Liou et al.

(10) Patent No.: US 11,762,055 B2
(45) Date of Patent: Sep. 19, 2023

(54) PROGRESSIVE GLOBAL POSITIONING SYSTEM AND METHOD THEREOF

(71) Applicant: Jenn-Chorng Liou, Hsinchu (TW)

(72) Inventors: Jenn-Chorng Liou, Hsinchu (TW); Jui-Pin Liu, Hsinchu (TW)

(73) Assignee: Jenn-Chorng Liou, Hsinchu (TW)

( * ) Notice: Subject to any disclaimer, the term of this patent is extended or adjusted under 35 U.S.C. 154(b) by 236 days.

(21) Appl. No.: 16/953,399

(22) Filed: Nov. 20, 2020

(65) Prior Publication Data

US 2021/0156949 A1 May 27, 2021

Related U.S. Application Data

(60) Provisional application No. 62/938,487, filed on Nov. 21, 2019.

(51) Int. Cl.
*G01S 5/02* (2010.01)
*G01S 5/00* (2006.01)
*H04W 12/03* (2021.01)
*H04L 9/40* (2022.01)
*H04W 12/033* (2021.01)

(52) U.S. Cl.
CPC .......... *G01S 5/0289* (2013.01); *G01S 5/0081* (2013.01); *G01S 5/0244* (2020.05); *G01S 5/02213* (2020.05); *H04L 63/0442* (2013.01); *H04W 12/033* (2021.01)

(58) Field of Classification Search
CPC .......... G01S 5/02; G01S 5/0205; G01S 5/244; G01S 5/0221; G01S 5/02213; G01S 5/0081; G01S 5/0289; G01S 5/14; G01S 5/0027; G01S 5/0242
See application file for complete search history.

(56) References Cited

U.S. PATENT DOCUMENTS

| | | | | |
|---|---|---|---|---|
| 6,757,518 | B2* | 6/2004 | Spratt | G01S 5/0072 455/500 |
| 10,677,886 | B2* | 6/2020 | Meadow | G01S 5/0027 |
| 10,705,221 | B2* | 7/2020 | Raab | G01S 19/215 |
| 11,272,559 | B2* | 3/2022 | Smith | H04W 84/18 |
| 2016/0284147 | A1* | 9/2016 | Trani | H04W 4/029 |

OTHER PUBLICATIONS

Zheng Yang et al., "Quality of Trilateration: Confidence based Iterative Localization", 2008, Hong Kong University of Science and Technology.
Xiaozhen Yan et al., "ITL-MEPOSA: Improved Trilateration Localization With Minimum Uncertainty Propagation and Optimized Selection of Anchor Nodes for Wireless Sensor Networks", publication Apr. 12, 2019, pp. 53136-53146, Digital Object Identifier 10.1109/ACCESS.2019.2911032.
Wi-Fi Alliance, "Wi-Fi Certified Location™ Orientation", Nov. 2017, Wi-Fi Certified Location Orientation.

* cited by examiner

*Primary Examiner* — Cassi J Galt
(74) *Attorney, Agent, or Firm* — WPAT, P.C

(57) ABSTRACT

A system and method is provided to establish a global positioning service with massive availability of "position-learning" radio communication nodes. Each communication node learns of its geographic coordinate in a global sense by harvesting location information from neighboring communication nodes. By conducting telemetry multiple times and implementing an error index, each communication node maintains its geographic coordinate with a precision that improves progressively over time.

26 Claims, 9 Drawing Sheets

PROGRESSIVE GLOBAL POSITIONING SYSTEM AND METHOD THEREOF

CROSS REFERENCE TO RELATED APPLICATION

All related applications are incorporated by reference. The present application is based on, and claims priority from, U.S. Provisional Application No. 62/938,487, filed on Nov. 21, 2019, the disclosure of which is hereby incorporated by reference herein in their entirety.

TECHNICAL FIELD

The technical field relates to providing global positioning services, with emphases to the indoor environment, in particular using the skill of harvesting geographic coordinate data of communication nodes with known location information and error indices.

BACKGROUND

There are many techniques to locate goods and persons in a global scale. The use of low-orbit satellites that continuously transmit "beacon" signals embedded with satellites' geographic coordinate and precision time references helps receiving devices to determine their locations via trilateration geometry. There are a few such kinds of global navigation satellite systems (GNSS) in operation and they have facilitated millions of devices to become "position-aware". Nowadays everyone has a smartphone equipped with GNSS so that a person can determine his or her whereabouts. However the GNSS signal fade quickly indoor. Without a reliable satellite signal indoor, GNSS is not useful in determining indoor locations.

Indoor wireless positioning is possible if there are multiple indoor "satellite-likes" that can transmit their geographic coordinate, in ways similar to what GNSS satellites do. However this will need surveys of the locations of all "satellite-likes" involved and becomes not feasible in light of labor needed, especially in a global scale.

With the popularity of WiFi signals in recent years wireless indoor positioning techniques have turn to any WiFi "signatures" that can be used. A WiFi SSID, for example, can plausibly represent the geographic location of the WiFi AP. There is no secret that smartphone operating systems count on SSID (and possibly MAC address) libraries as backup location assistance where GNSS signal is weak or unreliable.

Another useful WiFi "signature" is the WiFi AP's signal strength. It is assumed that there are multiple WiFi devices including fixed APs (Access Points) and their client devices (e.g., mobile phones). In-advance measurements can be carried out throughout the indoor premise for those fixed APs' radio signal strength "fingerprints". Later any mobile client device in that indoor premise can check signal strengths received against those APs. The readings are cross-checked against those in-advance measurements to determine the most likely location in that indoor premise.

Lately LTE/WiFi signal CSI (Channel State Information) is used in place of signal strength. In-advance measurements of CSI create a database of fingerprints for an indoor premise, which are later used to identify a mobile device's location in that premise. With low likelihood of misidentification (of locations) and with the aid of AI (artificial intelligence) a precision of ~1 cm can be achieved.

The drawback of the fingerprint approach is its in-advance measurement. In-advance site survey is a must, however automatic it can be carried out. That is the prerequisite. If there is a technique to provide indoor GNSS-like geo-locational radio broadcast, without the needs of in-advance coordinate site survey, it will be most convenient for indoor positioning purposes, wherever they are needed.

A system and method is provided with this in mind. What established is a global positioning service with massive availability of "position-sensitive" radio communication nodes. Each communication node learns of its geographic coordinate in a global sense by harvesting location information from neighboring communication nodes. By conducting telemetry multiple times and implementing an error index each communication node maintains its geographic coordinate with a precision that improves progressively over time. These communication nodes with progressively improved location accuracy are then used as the hinge points (also called "anchor nodes" in many literatures) for other communication nodes with no coordinate information or with coordinate information in less accuracy to conduct telemetry survey and secure (improved) coordinate information.

SUMMARY

According to one embodiment, the present invention provides a progressive global positioning system, which includes a plurality of communication nodes bearing absolute geographic position coordinates (also called Cartesian coordinates; hereinafter "geographic coordinates" or simply "coordinates") and accuracy merits. The communication nodes are distributed over a space and adjacent to one another. The embodiments of the present invention use Cartesian space coordinates in (x, y, z) to represent the geographic coordinates. However, when the present invention is actually implemented the geographic coordinates may be the coordinates in the geospatial format (i.e. latitude, longitude, altitude, etc.). The aforementioned "adjacent" does not limit the distance. In other words, if one communication node is within the radio coverage range of another communication node, these communication nodes can be considered adjacent to each other. Besides, one of the communication nodes may not have a geographic coordinate or cannot confirm whether the geographic coordinate thereof is correct (for example, the communication may be turned off and then be turned on again). The communication node would like to determine the geographic coordinate and the accuracy merit thereof in reference to any information available from adjacent communication nodes. The communication node intending to determine the geographic coordinate and the accuracy merit thereof can therefore perform a relative positioning algorithm with the communication nodes adjacent thereto ("the first hinge communication node") in order to determine the geographic coordinate and the accuracy merit of the communication node.

According to another embodiment, the present invention provides a progressive global positioning method, which includes the following steps: distributing a plurality of communication nodes bearing geographic coordinates and accuracy merits over a space, wherein the communication nodes are adjacent to one another; and performing a relative positioning algorithm by at least one of the communication nodes, intending to determine the geographic coordinate and the accuracy merit thereof, and a first hinge communication node for the communication node to determine the geographic coordinate and the accuracy merit thereof, wherein the first hinge communication node bears a geographic coordinate and an accuracy merit and is adjacent to the communication nodes.

As described above, the present invention provides a system and method for peer radio communication nodes to collaborate to share geographic coordinate and improve the accuracies via a grading metrics. Telemetry-capable radio devices are designed to participate in the geographic position information obtaining and hinging exercises. Radio devices involved can be those operating in the same or different communication standards. WiFi devices are hereby referred to most frequently although other radio standards may equally be capable. The communication nodes can be APs or clients. Communication nodes may not necessarily be meshed together as a network although linking them together in a mesh or an Ad-hoc network helps each communication node to be internet-enabled. That facilitates data authentication and position data consumption, as can be learnt later. Typical communication nodes in a home premise may include 3-5 APs and a few smartphones. Firmware in AP and apps in smartphone are executed to obtain coordinates from other communication nodes, to measure the distances against other communication nodes, and to determine its own coordinates according to a relative positioning algorithm.

In this work Bluetooth devices are occasionally referred to. A Bluetooth device can work as a communication node in association with peer WiFi nodes. This can be done by providing a Bluetooth-WiFi bridge. Multiple Bluetooth devices can also be meshed. Bluetooth devices have certain telemetry capabilities known in the industry. In this work a Bluetooth device can not only detect a peer Bluetooth devices nearby, but can also can carry out trilateration, in order to determine its geographic position. Bluetooth has the advantage of long lasting power. It further has the "advantage" of working only in a short distance. By this nature a Bluetooth device can exchange geographic position information and distance measurement results with the WiFi communication node it bridges to, to determine its coordinate via trilateration. This is useful in lost and found. Other radio technologies can equally well be suited to be used as a communication node. Examples include but are not limited to LTE, 5G, UWB, LoRa, ZigBee, and the like.

There are many known skills to measure distance between two radio communication nodes. These include signal strength, time-of-flight, etc. These radio telemetry skills are subject to errors introduced by object obstruction and reflection and introduce different degrees of uncertainty. Assessment of uncertainties in distance measurement becomes part of the positioning exercise which will later be indicated in a communication node's Accuracy Merit (AM), as will be explained later.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

DETAILED DESCRIPTION

Figure 1A:
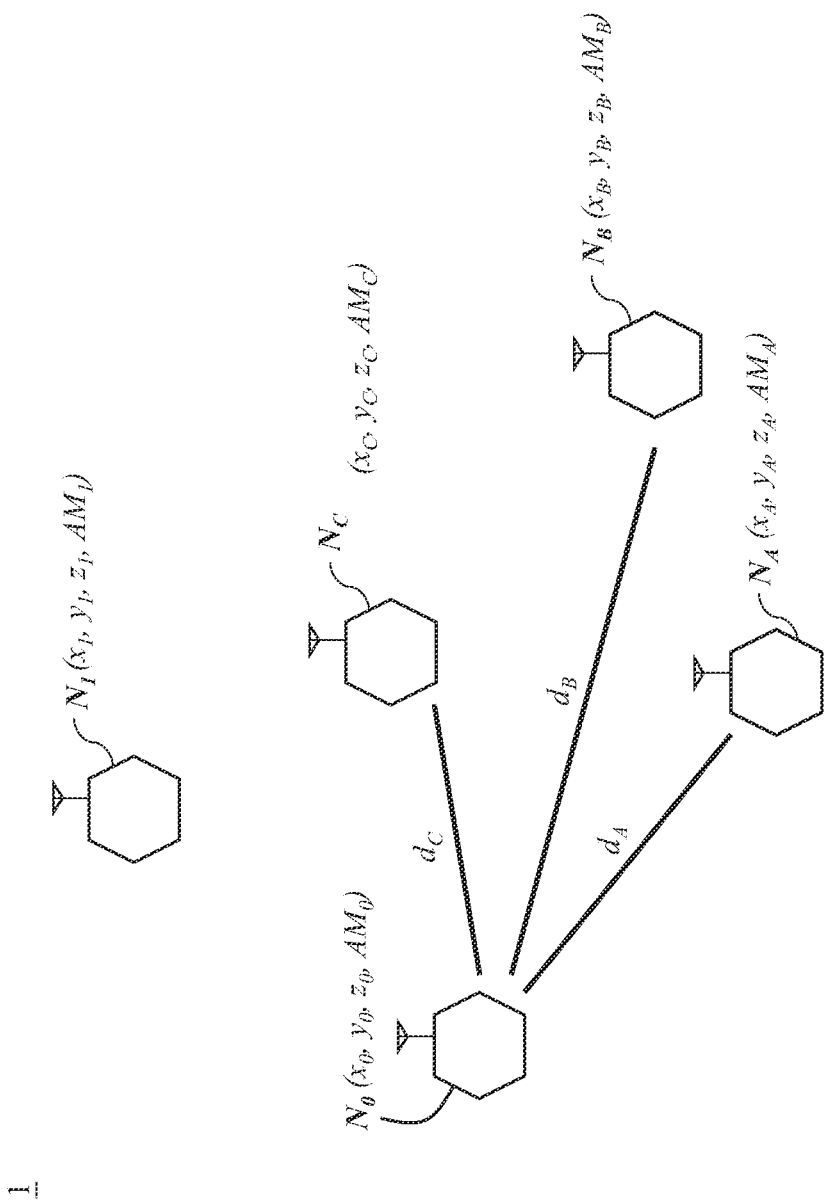
FIG. 1A is a schematic view to depict how coordinates of a communication node can be determined by trilateration.

In the following detailed description, for purposes of explanation, numerous specific details are set forth in order to provide a thorough understanding of the disclosed exemplary embodiments. It will be apparent, however, that one or more exemplary embodiments may be practiced without these specific details. In other instances, well-known structures and devices are schematically shown in order to simplify the drawing.

FIG. 1A is a first schematic view to explain how a communication node determines a geographic coordinate. FIG. 1A shows a progressive positioning system 1 in accordance with one embodiment of the present invention. Assuming that there are 3 "hinge" communication nodes $N_A$, $N_B$, and $N_C$, henceforth called the "first hinge communication nodes", not aligned in any way with known coordinates in $(x_i, y_i, z_i)$. Other communication nodes $N_0$ and $N_1$ within radio range of $N_A$, $N_B$, and $N_C$, intend to determine their geographic coordinates. The numbers of the communication nodes and the first hinge communication nodes are not limited by what drawn in FIG. 1A. There can be more communication nodes and the first hinge communication nodes. Any one or more of communication nodes $N_0$ and $N_1$ intend to carry out the relative positioning algorithm with one or more of the first hinge communication nodes $N_A$, $N_B$, and $N_C$, to determine or update their geographic coordinate and accuracy merit. In communication nodes $N_0$ and $N_1$'s initial state (such as upon their first installation) default values for coordinate and accuracy merit will be available.

In the followings it is to explain how do communication nodes $N_0$ and $N_1$ determine their geographic coordinates from the first hinge communication nodes $N_A$, $N_B$, and $N_C$ according to a relative positioning algorithm. The calculations involved in a relative positioning algorithm include retrieving the geographic coordinates from neighboring first hinge communication nodes, measuring distances from neighboring first hinge communication nodes, and determining the geographic coordinate via trilateration, as depicted in the followings. The first hinge communication nodes $N_A$, $N_B$, and $N_C$ have known geographic coordinates $(x_i, y_i, z_i)$, where suffix i stands for first hinge communication nodes $N_A$, $N_B$, and $N_C$. The geographic coordinate and accuracy merit of the first hinge communication node $N_A$ are called $(x_A, y_A, z_A)$ and $AM_A$. The geographic coordinate and accuracy merit of the first hinge communication node $N_B$ are called $(x_B, y_B, z_B)$ and $AM_B$. The geographic coordinate and accuracy merit of the first hinge communication node $N_C$ are called $(x_C, y_C, z_C)$ and $AM_C$. The geographic coordinate and accuracy merit of the communication node $N_0$ are called $(x_0$, $y_0$, $z_0$) and $AM_0$. The geographic coordinate and accuracy merit of the communication node $N_1$ are called ($x_1$, $y_1$, $z_1$) and $AM_1$. By principles of geometry if first hinge communication nodes $N_A$, $N_B$, and $N_C$ are not aligned on a straight line and distances to them $d_A$, $d_B$, and $d_C$ are also known, the communication node $N_0$'s coordinates in ($x_0$, $y_0$, $z_0$) can be determined by the math of trilateration. The distances to first hinge communication nodes $d_A$, $d_B$, and $d_C$ actually first decide the relative (or offset) position, or relative coordinate, to communication node $N_0$ and communication node $N_0$' coordinate ($x_0$, $y_0$, $z_0$) is then found by additions or subtractions. In this work each communication node's geographic coordinate is further given an Accuracy Merit, defined later, so that both distance errors in a telemetry measurement and the errors inherited from its hinge communication nodes can be included. That is, at least one of the communication nodes intending to determine its geographic coordinate and the accuracy merit, here $N_0$, performs a relative positioning algorithm with a first hinge communication node (one or more among $N_A$, $N_B$, and $N_C$) to determine its geographic coordinate and accuracy merit.

In a 3D space even if first hinge communication nodes $N_A$, $N_B$, and $N_C$ are not aligned on a straight line, an ambiguous location to ($x_0$, $y_0$, $z_0$) as determined by communication node $N_0$ does exist. The correct (x, y, z) can be determined either by adding a $4^{th}$ first hinge communication node or by creating a slight movement of any of communication nodes $N_A$, $N_B$, and $N_C$. This is a multilateration problem and is beyond the scope of this discussion. In addition, in a 3D space even if there are only one or 2 first hinge communication nodes, the ($x_0$, $y_0$, $z_0$) for communication node $N_0$ can still be found, but with greater uncertainties. Here we use the term "trilateration" to represent the geometry skills in use of this category in general. Other relative positioning algorithms, such as triangulation and phase/angle of arrival (AoA) are equally possible, with different sets of math involved and different working models applied to co-working communication nodes.

A readily available telemetry tool is the IEEE® 802.11mc standard. 802.11mc-enabled WiFi devices including APs and smartphones are getting popular. An 802.11mc-enable device can be programmed to behave as an "initiator" or a "responder". In FIG. 1A any of the communication nodes $N_0$, $N_1$, $N_A$, $N_B$, and $N_C$ can either be an initiator or a responder. Fine time measurement (FTM) of the round trip time (RTT) of a signal between an initiator and a responder determines the distance between 2 communication nodes by the principle of time-of-flight. In many positioning trials the arrangement is that multiple 802.11mc-enabled APs with coordinates obtained by geographic survey are deployed over a space as the responders. Moving smartphones, also 802.11mc-enabled, act as the initiators. A smartphone measures distances against those responders, fetches geographical coordinates from them, and gets to know its coordinates by trilateration. Other than the time-of-flight method used in 802.11mc, the relative signal strength indicator (RSSI) method can also be used. Communication nodes $N_0$, $N_1$, can count on the signal strengths they received from communication nodes $N_A$, $N_B$, and $N_C$ to determine distances to those communication nodes. In this work distance measurement method includes signal strength, time-of-flight and all other possible means.

The proposition of this work is that not all of the responders need in-advance geographic survey. The APs (taking communication nodes $N_0$, $N_1$ in FIG. 1A as examples) could rather obtain their coordinates from those APs (such as first hinge communication nodes $N_A$, $N_B$, and $N_C$) with known coordinates and accuracy merits. Later when any node with a higher accuracy merit shows up, the AP (communication nodes $N_0$, $N_1$ in FIG. 1A) shall re-do the trilateration and seek to improve the accuracy of its coordinates.

Figure 1B:
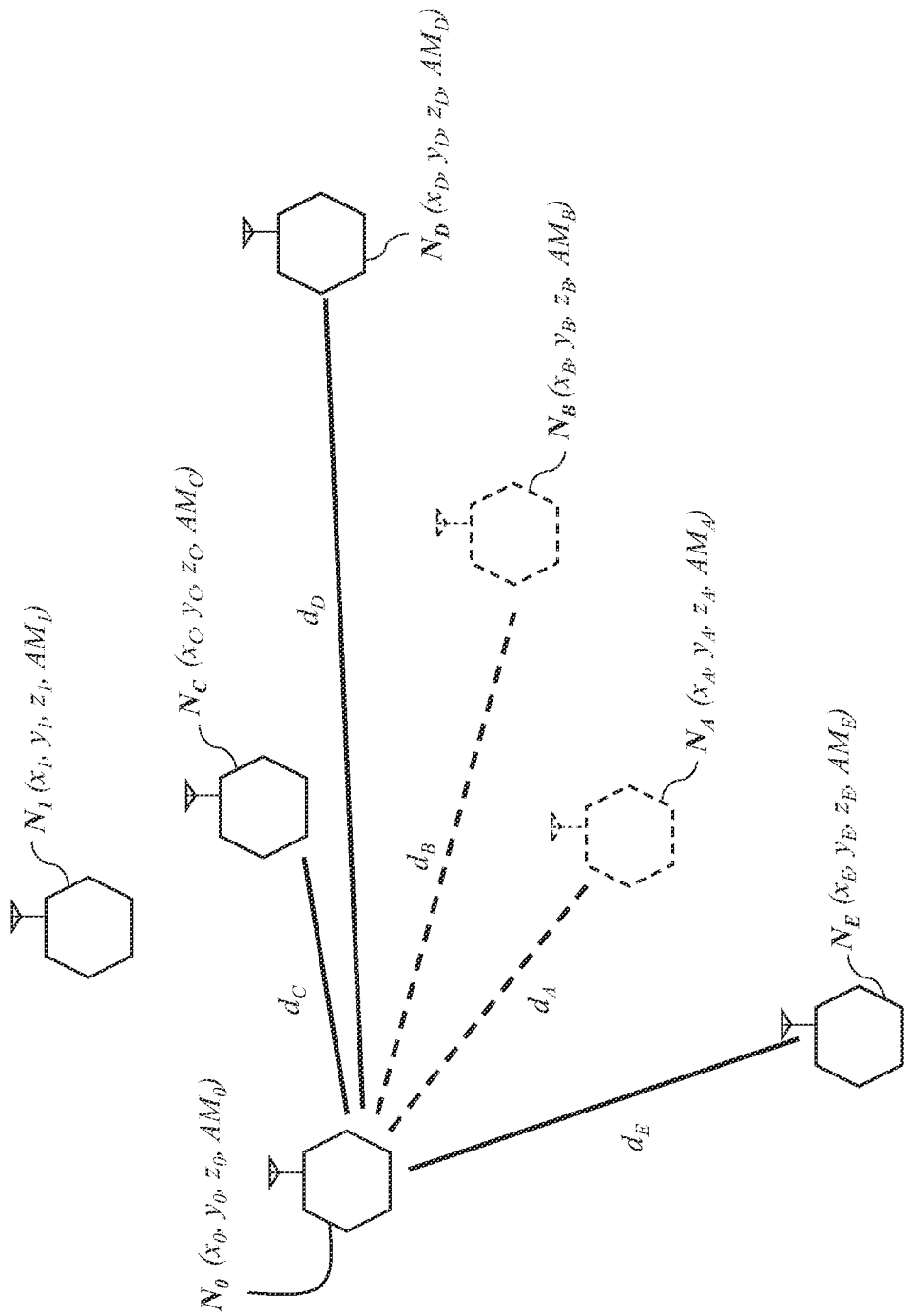
FIG. 1B is a schematic view of to depict how coordinates of a communication node can further be determined by additional hinge communication nodes, in accordance with the second exemplary embodiment of the disclosure.

In FIG. 1B, the second hinge communication nodes $N_D$ and $N_E$ may have geographic coordinates with higher accuracy merits. At this time the AP (communication nodes $N_0$ or $N_1$) carries out trilateration exercises with $N_D$, and $N_E$ to seek opportunities of determining a better set of coordinates. Distances found by communication node $N_0$ to $N_D$ and $N_E$ are $d_D$, $d_E$, respectively. The geographic coordinate and accuracy merit of the second hinge communication node $N_D$ are called ($x_D$, $y_D$, $z_D$) and AMD. The geographic coordinate and accuracy merit of the second hinge communication node $N_E$ are called ($x_E$, $y_E$, $z_E$) and $AM_E$. Other than choosing the second hinge communication nodes $N_D$ and $N_E$, communication node $N_0$ may take advantage of one among the first hinge communication nodes $N_A$, $N_B$, and $N_C$ with the best accuracy merit ($N_C$ as depicted in FIG. 1B) to participate in the trilateration. Communication node $N_0$ thereafter compares the accuracy merit obtained this time with those obtained earlier and adopts the geographic coordinate with the best accuracy merit. That is, when the communication node $N_0$ and a second hinge communication node ($N_D$, or $N_E$) bearing the geographic coordinate and the accuracy merit perform the relative positioning algorithm again to calculate the geographic coordinate and accuracy merit, the communication node $N_0$ compares its geographic coordinate and the accuracy merit with the geographic coordinate and the accuracy merit obtained previously, and then adopts one of the geographic coordinates. The accuracy merit of the geographic coordinate adopted is higher than the accuracy merits of the geographic coordinates not adopted.

Firmware in the AP and app in smartphone can be programmed so that responders and initiators exchange the distance measurement and geographic coordinate data. For example a Google Android® API "ranging request" (RangingRequest) can be created by specifying a list of APs or Wi-Fi Aware (also an industrial standard) peers among which ranging exercises are requested. Multiple APs or Wi-Fi Aware peers can be specified in a single ranging request. After execution the distances to all devices are measured and returned. Additionally in 802.11mc geographic coordinate information in geospatial format (such as latitude, longitude and altitude) can be embedded in the LCI information (see below) of the FTM frames. This coordinate information, in addition to the distances obtained by FTM, assists an 802.11mc-enabled AP (e.g. communication node $N_0$ or $N_1$ in FIG. 1A) to obtain its coordinates via trilateration.

The issue is how to secure peer communication nodes with reliable geographic coordinates in the same space where the AP is located, to participate in relative positioning exercises. In this work a precision node (called "super hinge node") as was established by a professional surveyor will be given the highest accuracy merit grade. Other solutions can be as simple as using smartphones as hinge communication nodes and placing them in that same area while GPS works. Receiving GPS signals multiple times does provide geographic coordinate in a higher precision based on statistical calculations, resulting in a more reliable accuracy merit. Smartphone-based distance survey tools such as UWB or LiDAR may get involved to improve the precision of a telemetry effort in a short range. If GPS is unavailable, inertial navigation as exemplified below works but the accuracy may quickly degrades after moving for extended distance. In addition, Wi-Fi Aware certainly helps to search for peer APs nearby, providing opportunities for renewed hinge communication nodes. For each trilateration exercise the accuracy merit drops due to the telemetry error added. In this manor communication nodes on the "rear" will always inherit uncertainties from front ones and obtain poorer accuracy merits. With these in mind, as long as there is a common definition of the Accuracy Merit, an AP can continue to search for better reference hinge peers and progressively fine tune its coordinates toward a better accuracy; and to be used as a hinge communication node in good standing to others.

In this work, to facilitate explanation, the term "initiator" is borrowed to designate the communication node that has the need of an initial or an improved location data (communication nodes $N_0$ or $N_1$ as examples). And the term "responder" is occasionally used to designate the participated hinge communication nodes (first hinge communication nodes $N_A$, $N_B$, $N_C$, and second hinge communication nodes $N_D$, $N_E$ as examples).

An isolated initiator communication node can determine its coordinates if 3 hinge communication nodes are nearby and distances to them can be measured. By "isolated" it means that only limited radio communications are needed between the initiator and the responder. For example, the 3 hinge communication nodes need to "broadcast" their coordinates (1-way). Moreover, the communication node needs to measure the distances, 1 or 2-way if in signal strength and 2-way if by time-of-flight. A hinge communication node can even be mobile (e.g. a smartphone, see below) as long as geographic coordinates are provided from time to time along its moving trace and the distance measurements are allowed from time to time as well. As long as a geographic coordinate are accompanied by a distance measurement given at the same time, this will work. That is, other than broadcasting coordinates and distance measurement exercises, no additional radio collaborations among participating communication nodes such as mesh networking or synchronization are necessary. Even if the Android RangingRequest API is being used, the list of APs or Wi-Fi Aware peers do not need to enter a mesh network, neither does a participating smartphone need to "associate" with an AP; and synchronization is not necessary. If other relative positioning algorithms, such as triangulation or phase/angle of arrival, are in consideration more involved radio collaboration may be required.

Inertial navigation may facilitate to "convey" geographic position data from a location with known set of coordinates to another location. A smartphone can obtain its coordinate by utilizing hinge communication nodes nearby, or simply by receiving GNSS (GPS) signals. Afterward while the smartphone moves, by principles of inertial navigation, sensors such as accelerometer and gyroscopes are used to continuously identify the position, the orientation and velocity of the smartphone by integrating information received from the motion sensors. If the smartphone move to a new space where a communication node in need to obtain its coordinates is located, it works as temporary hinge communication nodes on its moving trace. Assuming that on that trace 3 position samples not aligned in anyway are utilized, the communication node get to know its coordinates by trilateration. Inertial navigation accumulates errors in each dead reckoning calculation. There are many skills to improve the accuracy and better tools either by hardware or software will become available sooner or later.

Figure 2:
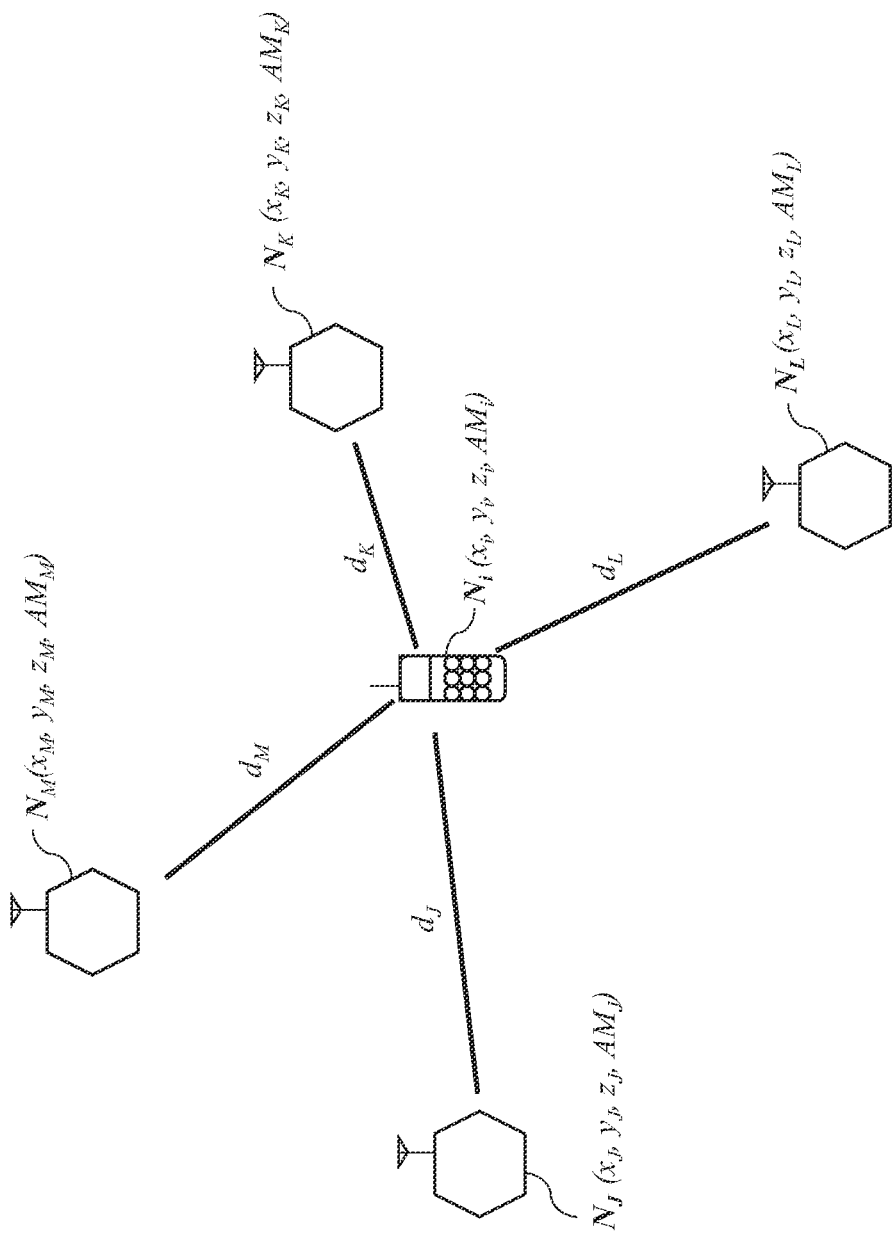
FIG. 2 shows how hinge communication nodes with reliable coordinates provide positioning services to others.

FIG. 2 shows an embodiment depicting how hinge communication nodes with reliable coordinates provide positioning services to others. As an exemplary use scenario in a place such as a household or public space, (first or second) hinge communication nodes $N_J$, $N_K$, $N_L$, and $N_M$ with reliable coordinates can be deployed so that movable communication nodes such as smartphones, acting as initiators, can identify their absolute coordinates by exercising relative positioning algorithm. Here the geographic coordinate and accuracy merit of the hinge communication node N are called $(x_J, y_J, z_J)$ and $AM_J$; the geographic coordinate and accuracy merit of the hinge communication node $N_K$ are called $(x_K, y_K, z_K)$ and $AM_K$; the geographic coordinate and accuracy merit of the hinge communication node $N_L$ are called $(x_L, y_L, z_L)$ and $AM_L$; the geographic coordinate and accuracy merit of the hinge communication node $N_M$ are called $(x_M, y_M, z_M)$; and the geographic coordinate and accuracy merit of the communication node $N_i$ (the smartphone) are called $(x_i, y_i, z_i)$ and $AM_i$. Distances found by communication node $N_i$ to hinge communication nodes $N_J$, $N_K$, $N_L$, and $N_M$ are $d_J$, $d_K$, $d_M$, $d_M$ respectively. After obtaining its geographic coordinate with the relative positioning algorithm, the smartphone may use its newly obtained location info in various applications. For example, the location data may be sent to an online map service so that the phone displays its location on a map. The location data may also be sent via a tracking server on the cloud to a 3$^{rd}$ party device to tell the whereabouts of the phone's owner. Or it may be sent to a gaming server for a location-sensitive game response. That is, position data can be consumed by smartphones. Here one of the communication nodes is a mobile device and the mobile device delivers its geographic coordinate to another application to display the geographic coordinate of the mobile device, or to a tracking server. Then, the tracking server provides the geographic coordinate of the mobile device for another electronic device.

In order to provide traceability to relative positioning activities, each of the communication nodes is assigned a unique ID (identity). This can be done by either hardware or software means. Serialization of chips, serial numbers programmed to a flash memory are examples of hardware means. By using the private/public key cryptography known to the industry, a public key registration mechanism is also possible. Each communication node can be given a public key based on a private key randomly generated and only known to the communication node itself. The conversion from a private key to a public key is done with an ECDSA or Elliptic Curve Digital Signature Algorithm, or the digital signature technique, also known to the industry. In every kind of digital signature algorithm, the size of the private key space is often astronomically large. It is computationally infeasible for anyone to ever guess it or pick an identical one. Similarly the public key space is also so large that the possibility of duplication is nearly zero. A communication node's ID (that is, the public key) as created by a public key cryptography is therefore regarded as unique and can be used in place of the serial number. Once assigned other communication nodes recognize this communication node by its unique public key, henceforth called "unique ID".

Figure 3:
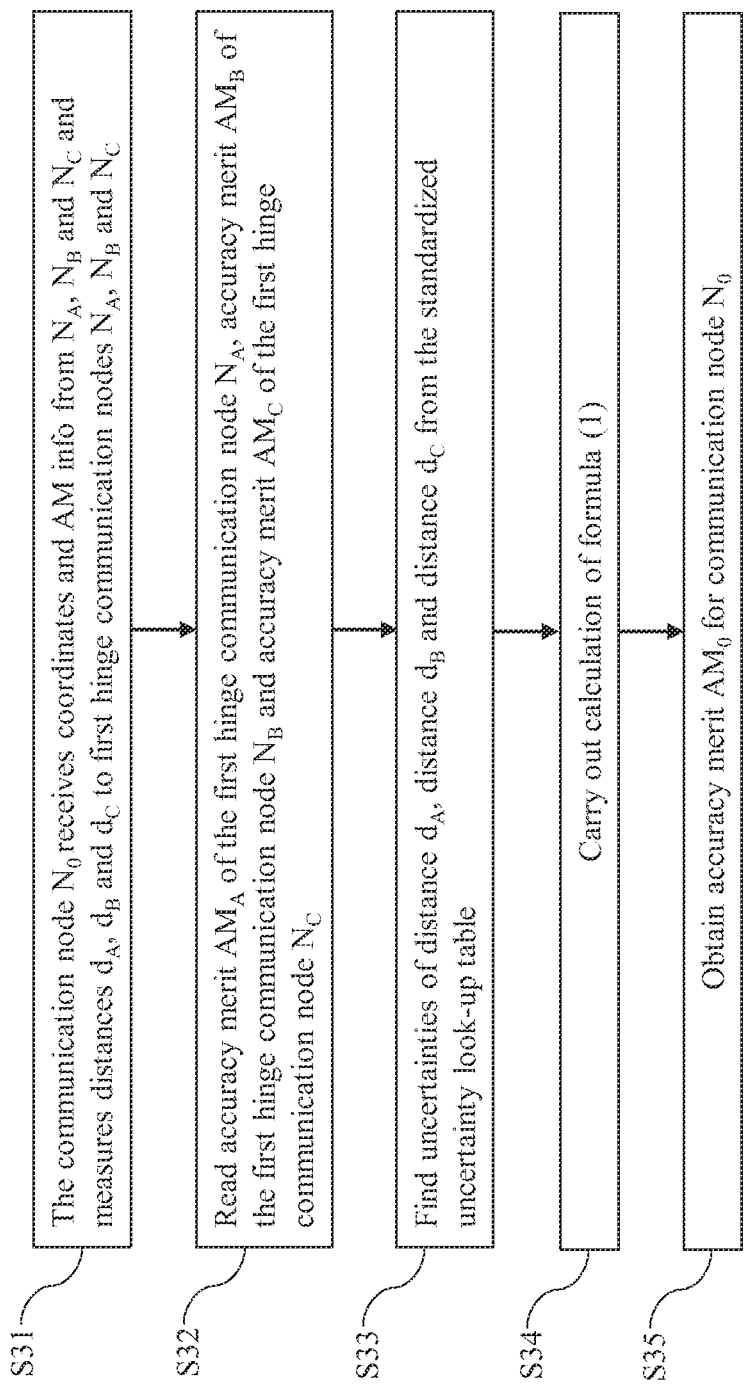
FIG. 3 is a flowchart depicting how Accuracy Merit (AM) is assessed in a trilateration exercise.

The design of AM is intended to provide an easy-to-understand metrics for position data consumers. The value of AM may very conveniently be designed to be from 0 to 5, with 5 being the highest precision, indicating a "super hinge node" as was certified by a professional surveyor (see below); while 0 indicating a communication node without a proper evidence of precision. Please refer to Table 1 below for an exemplary cross reference between AM and coordinate error ($E_C$) in meters. Also be aware that integers are used for AM simply for exemplary purposes, to find corresponding range of coordinate errors. Actual values for AM and $E_C$ are continuous, not discrete. According to Table 1, if the hinge communication node $N_i$ is given an accuracy merit $AM_i$, an "error range" sphere can be drawn around $N_i$'s coordinate $(x_i, y_i, z_i)$, indicating the fundamental uncertainty of the communication node $N_i$. FIG. 3 is a flowchart depicting how Accuracy Merit (AM) is assessed in a trilateration exercise, according to an embodiment of this invention. An initiator communication node $N_0$ receives coordinates and AM info from $N_A$, $N_B$ and $N_C$ (as depicted in FIG. 1) and measures distances $d_A$, $d_B$ and $d_C$ to $N_A$, $N_B$ and $N_C$. There are many error factors here. Uncertainties to each individual of $d_A$, $d_B$ and $d_C$ are influenced by radio bandwidth and data rates. Object obstruction, e.g. wall and furniture, introduces errors. Uncertainties in distance measurements in a typical trilateration exercise therefore create error range spheres around the tips of the lines representing $d_A$, $d_B$ and $d_C$ and they must be reflected in the accuracy merit in association with the coordinate obtained. A slanting triangular pyramid as formed by $N_0$, $N_A$, $N_B$ and $N_C$ may introduce greater trilateration error than a regular-shaped pyramid. Furthermore, if the accuracy merit of $N_A$ is much better than $N_B$ and $N_C$, in calculating $N_0$'s geographic coordinate, the error sensitivities to communication nodes $N_B$ and $N_C$ will be much greater than communication node $N_A$, because communication nodes $N_B$ and $N_C$'s error spheres are much bigger. Not to be distracted by too many variables, the following formula only provides a heuristic guideline in an ideal circumstance (e.g., values of AMs, distances to communication node $N_0$ and telemetry uncertainties are comparable among participating hinge communication nodes, and the pyramid formed against communication node $N_0$ is normal):

$$E_{C0} = \overline{E_{Ci}} + \overline{E_{Ri}} \quad (1)$$

Here $E_C$ indicates coordinate uncertainties as can be obtained from the value of AM according to Table 1, and $E_R$ indicates distance measurement (radio ranging) uncertainties. The suffix 0 indicates the initiator $N_0$ and suffices in i indicate all participating hinge communication nodes, the first hinge communication nodes $N_A$, $N_B$ and $N_C$ in this case. $E_{CA}$ is obtained from $AM_A$ according to Table 1; $E_{CB}$ is obtained from $AM_B$, etc. Coordinate uncertainties in $E_C$ is by no means only the uncertainty of the smallest digit. $E_{CA}$ is an indication of how precise $(x_A, y_A, z_A)$ is, as summarized by $AM_A$. In a more involved trilateration assessment, uncertainties in terms of x, y, z axes are treated separately and variances for x, y, z axes are applied. Here only a simple average among axes is used as an example. $AM_A$ is defined by communication node $N_A$'S previous "best" relative positioning exercises, as was explained earlier. That is, among communication node $N_A$'s previous relative positioning exercises it picks the one with the best accuracy merit, as described in the embodiment of FIG. 1B. $E_C$ and AM alike therefore successively inherited all error factors included in previous best relative positioning exercises. As for $E_R$, it is related to physical limitations determined by radio bandwidth, data rate, frequency in use and object obstruction. Evaluation of $E_R$ is very complicated but can still be managed by standardized uncertainty look-up tables based on theoretical and empirical data. The overbar in formula (1) indicates taking average value out of i cases. The coordinate uncertainty of the initiator communication node $E_{C0}$ not only inherits errors $E_{Ci}$ from its hinge communication nodes, but also aggregates errors $E_R$ in those rounds of distance measurements. Evidently there are mathematical limitations in the evaluation of AM for the initiator communication node as defined by $E_{C0} = \overline{E_{Ci}} + \overline{E_{Ri}}$. In a ranging effort, if a smartphone is UWB or LiDAR-equipped, $E_R$ may improve substantially. That is, the communication node $N_0$ calculates the accuracy merit according to a plurality of error factors. The error factors include the accuracy merits of the hinge communication nodes $N_A$, $N_B$ and $N_C$, and the uncertainty of the distance between the communication node $N_0$ and the first hinge communication nodes $N_A$, $N_B$ and $N_C$ obtained by the communication node $N_0$ via the relative positioning algorithm. Below is the table that depicts how accuracy merit is to be cross referenced to uncertainty $E_C$.

TABLE 1

| Accuracy Merit (AM) | $E_C$ Uncertainty (meters) |
| --- | --- |
| 5 | 0.1 with a certifiable signatory |
| 4 | 0.3 |
| 3 | 1 |
| 2 | 5 |
| 1 | 25 |
| 0 | untrustworthy |

To support these calculations and assessment information carried by the radio signal of the communication node $N_0$ and the first hinge communication nodes $N_A$, $N_B$ and $N_C$ may therefore include several pieces of information. These are just examples: 1) a public key, 2) current coordinates $(x_i, y_i, z_i)$, 3) Accuracy Merit $AM_i$ 4) time-of-flight responses and 5) other networking and synchronization information. The IEEE 802.11-2016 standard does facilitate coordinate and precision indications. Location Configuration Information (LCI) includes latitude, longitude, altitude and their uncertainties (quantified errors). There is also a Location Civic Report (LCR or CIVIC) that can provide a "civic" address in a standardized key-value format.

The steps of this embodiment include the followings:

Step S31: the communication node $N_0$ receives coordinates and AM info from $N_A$, $N_B$ and $N_C$ and measures distances $d_A$, $d_B$ and $d_C$ to first hinge communication nodes $N_A$, $N_B$ and $N_C$.

Step S32: read accuracy merit $AM_A$ of the first hinge communication node $N_A$, accuracy merit $AM_B$ of the first hinge communication node $N_B$ and accuracy merit $AM_C$ of the first hinge communication node $N_C$.

Step S33: find uncertainties of distance $d_A$, distance $d_B$ and distance $d_C$ from the standardized uncertainty look-up table.

Step S34: carry out calculation of formula (1).

Step S35: obtain accuracy merit $AM_0$ for communication node $N_0$.

Figure 4:
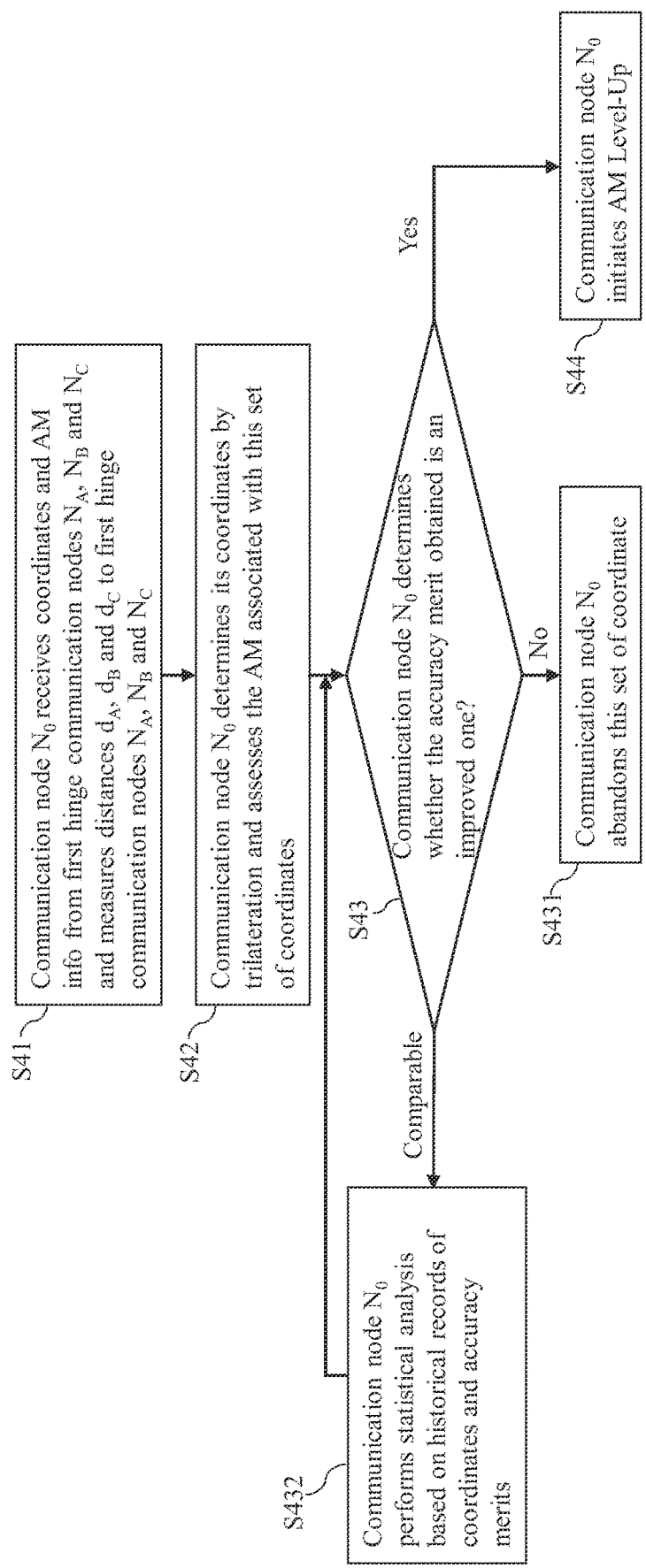
FIG. 4 is the first flowchart for the proposed method to progressively improve the AM of a communication node.

FIG. 4 is the first flowchart for the proposed method to progressively improve the AM of a communication node. Each communication node strives to improve its AM so that it can provide more reliable coordinates in upcoming position data consumption. It can do so by continuously watch any indication of newly available hinge communication nodes. If ever a hinge communication node with a higher AM grading within radio range is identified, the relative positioning algorithm introduces more "weighting" in the trilateration exercise to that hinge communication node's coordinate, as compared to peer communication nodes with lower AM grading. This can be done by omitting participating communication nodes with the lower AM grades, as exemplified in FIG. 1B as those dotted communication nodes $N_A$ and $N_B$ or via other statistical means. Any hinge communication node with a higher AM grading will be used to carry out another relative positioning algorithm exercise although any hinge communication node with a comparable AM grading are equally important. This is because that uncertainty to radio measurement is stochastic in statistical senses. Taking multiple measurements against hinge communication nodes with comparable AM grading eventually helps a communication node's set of coordinates to converge with a statistically improved AM grading. In this work statistical means may include mean, variance analyses, Kalman filtering, linear least-squares estimation, iteratively reweighted least-squares estimation, non-linear least-squares technique, and all other methods well-known to the industry. Meticulous use of statistical means often results in reduced uncertainties and gives rise to an improved AM of the initiator communication node $N_0$, although statistical means is still subject to many mathematical limitations. That is, each of the communication nodes performs a statistical analysis according to a historical geographic coordinate of the communication node in order to improve the geographic coordinate and the accuracy merit of the communication node.

In summation, the accuracy merit is a composite indicator. Firstly, an initiator communication node can only assess its accuracy merit (and geographic coordinate) by using hinge communication nodes recognizable by this system and bearing geographic coordinates. The accuracy merit therefore is traceable. An initiator communication node has a clear advantage securing a better accuracy merit if it is within the radio range of a "super hinge node" rather than a hinge communication node whose coordinate is only defined by GPS. An accuracy merit includes the coordinate uncertainties and the distance measurement uncertainties in a relative positioning exercise per formula (1) $E_{CO} = \overline{E_{Ci}} + \overline{E_{Ri}}$, in which $E_C$ successively inherited the errors incurred in all previous best relative positioning exercises. Moreover, as the number of relative positioning exercises increases, more geographic coordinate data become available and it will be statistically converged. A reduced $E_C$ and therefore an improved AM will become available. The accuracy merit combines the traceability aspect of geographic coordinate and accuracy merit, and the mathematically cumulative aspects of uncertainty's occurrence, inheritance and statistical improvement, in this progressive positioning method according to the embodiment of this invention. And it becomes the single indicator for the merit of a hinge communication node, in terms of the quality of its geographic coordinate. Although it may not be precise or correct in all occasions, it does provide a momentum of improvement long-term for all geographic coordinates in this system. In case it is beneficial, creating multiple accuracy merits is also possible and is duly claimed as an embodiment of this invention. A credibility merit indicating the number of hinge communication nodes inherited and the number of successions to a high precision communication node, and merit indices according to errors due to hinge communication nodes geometry, telemetry errors or statistical errors are all examples.

Steps S41: communication node $N_0$ receives coordinates and AM info from first hinge communication nodes $N_A$, $N_B$ and $N_C$ and measures distances $d_A$, $d_B$ and $d_C$ to first hinge communication nodes $N_A$, $N_B$ and $N_C$. Go to Step S42.

Step S42: communication node $N_0$ determines its coordinates by trilateration and assesses the AM associated with this set of coordinates. Go to Step S43.

Step S43: communication node $N_0$ determines whether the accuracy merit obtained is an improved one. If yes, go to Step S44. If no, go to Step S431. If comparable, go to Step S432.

Step-S431: communication node $N_0$ abandons this set of coordinate.

Step S432: communication node $N_0$ performs statistical analysis based on historical records of coordinates and accuracy merits. Return to Step S43.

Step S44: communication node $N_0$ initiates AM Level-Up.

In case an initiator communication node encounters multiple hinge communication nodes with AM grading better than what it has, it has a high likelihood that the trilateration exercise gives rise to a set of coordinates with a higher precision, or higher AM grading. In FIG. 4 a higher AM grading originated either from a statistical analysis of past log or from a single trilateration exercise creates an "Accuracy Merit Level-Up" or simply AM Level-Up. This is significant not only to this communication node, but also to those communication nodes in the vicinity of its radio coverage. An AM Level-Up must therefore be certified in high scrutiny.

Figure 5:
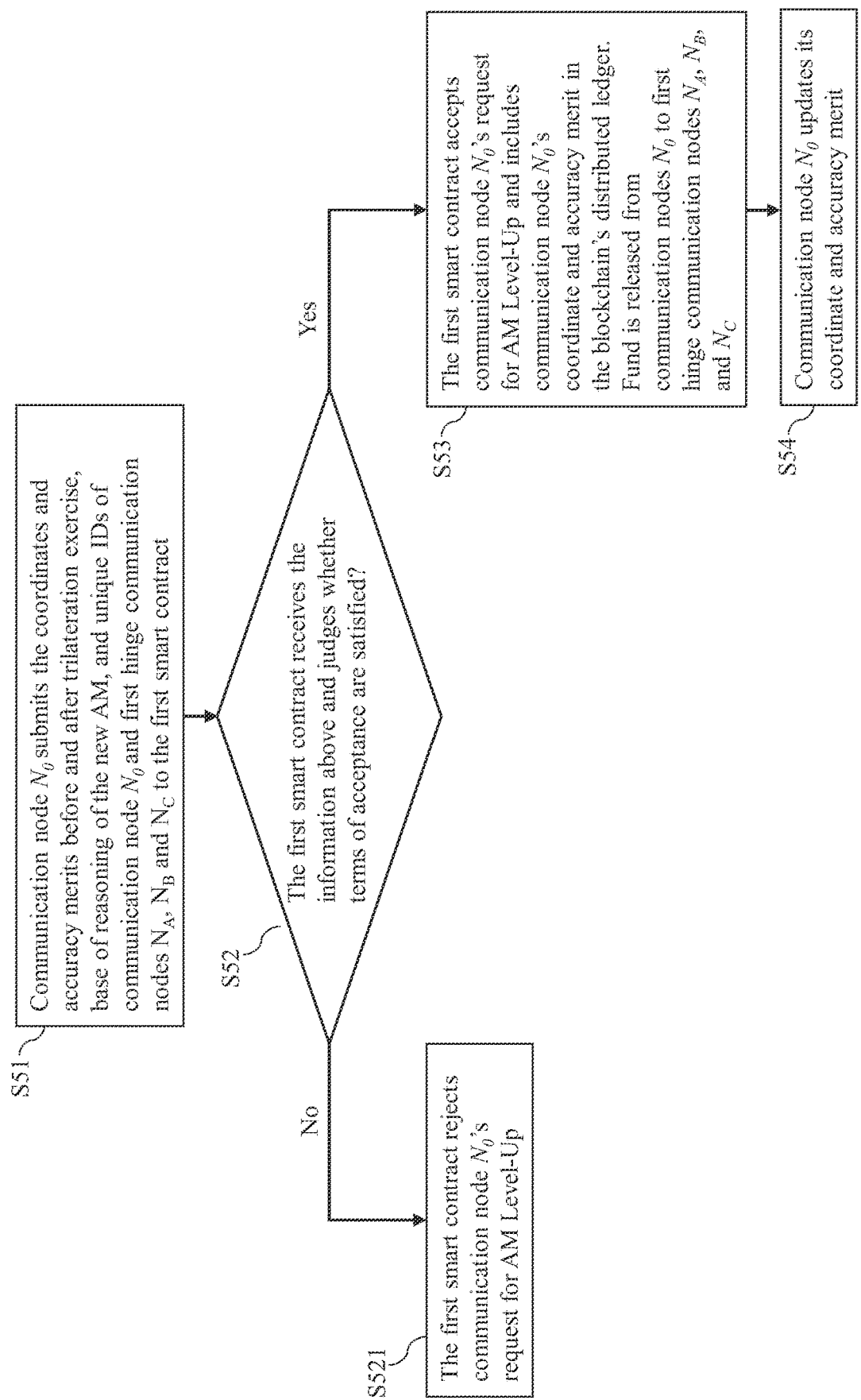
FIG. 5 shows a novel way to keep records of transactions of AM Level-Ups by using a smart contract in a blockchain.

FIG. 5 shows a novel way to keep records of transactions of AM Level-Ups. Here a "transaction" is defined by a fair judgment of an AM Level-Up. In order not for an AM Level-Up event be sabotaged by a malicious party, the calculation information of this transaction must be validated by a fair third party. The fair party examines the past AM Level-Up histories of the participants and the validity of calculation, and releases a go-ahead if the calculations are justified and the succession of geographic coordinates and accuracy merits from participating communication nodes are validated. This communication node therefore officially obtains an AM Level-Up. A blockchain makes use of a distributed ledger which intrinsically cannot be tampered. It therefore becomes a good tool to maintain succession relationship among communication nodes for their geographic coordinates and accuracy merits. With the benefit of the blockchain technology, this can most easily be done by a smart contract which acts as the fair third party. In FIG. 5 communication node $N_0$ is an initiator communication node intending to obtain an approval for an AM Level-Up. It submits the calculation information of this transaction for the smart contract to review. A smart contract is a computer program running on the internet, or a service cloud, on a blockchain platform such as Ethereum®. A smart contract is intended to execute, control and document events and actions according to the terms of the contract. In order to prevent forgery of the identity of the communication node $N_0$, the information provided by $N_0$ to the smart contract needs to be encrypted with a private key through a digital signature method, and then decrypted and identified by the smart contract with $N_0$' public key. Each AM Level-Up is bound by the smart contract indicating the prerequisites or terms for acceptance. An executed smart contract clearly keeps the participating parties and the resulting AM grade, and the details are stored into a distributed ledger (henceforth called "ledger" in short) in a blockchain. Any new contract can be traced and cannot be altered due to the nature of a blockchain. The resulting position coordinates of each participating communication node not only progressively get more accurate, but also are temper-resistant.

In FIG. 5 the "calculation information" submitted by communication node $N_0$ includes the coordinates and accuracy merits before and after trilateration exercise, base of reasoning of the new AM, and unique IDs of communication node $N_0$ and first hinge communication nodes $N_A$, $N_B$ and $N_C$. Within the calculation information the bases of reasoning further include whether the improvement was originated from $E_C$ (coordinate uncertainties) which is traceable in the ledger, or $E_R$ which was judged by $N_0$ according to the standardized telemetry uncertainty look-up tables for $E_R$, or simply a result by statistical improvement, or their combinations. Supporting data are also included. The calculation information also includes physical limitations for communication node $N_0$, such as VID/DID, outlined below, and/or the frequency and bandwidth in use in carrying out the telemetry with the first hinge communication node. The acceptance terms of the smart contract include 1) the hinge communication nodes are traceable, that is, the geographic coordinates and accuracy merits already exist in the ledger of the blockchain and 2) the trilateration as executed by $N_0$ is valid. For 1) the hinge communication nodes are traceable, the smart contract can verify according to the ledger. For 2) the trilateration as executed by $N_0$ is valid, the smart contract can look into bases of reasoning for an AM Level-Up as submitted by $N_0$ and check against the ledger for any useful record. For example, if the communication node $N_0$ claims that the improvement is from a traceable $E_C$, the smart contract can refer to the $E_C$ values of the first hinge communication nodes $N_A$, $N_B$ and $N_C$ in the ledger with the aid of their unique IDs, for confirmation. If the communication node $N_0$ claims that the improvement is the result of statistical improvement, the smart contract can look into its supporting data for confirmation. The supporting data for statistical improvement shall include the number of samples, key statistical parameters, and the length of the measurement period. The smart contract can still look into statistical soundness and identify the declared measurement period in the ledger. If the communication node $N_0$ claims that the improvement comes from the judgment of the $E_R$ by the uncertainty look-up table, the smart contract can make the judgment based on the wireless measurement physical limitation of the communication node $N_0$. As stated standardized telemetry uncertainty look-up tables are based on theoretical and empirical data related to the operating radio frequency, bandwidth, etc. These uncertainties are therefore device-defendant. Recognizable "vendor id (VID)" and "device id (DID)" as are widely used in the networking industry can be used to identify each communication node's radio technology in use, limitations in radio bandwidth, data rate, frequency etc. A smartphone's model and origin can also be identified by the Type Allocation Code (TAC) part of its IMEI number. The smart contract can also be designed to look over a communication node's VID/DID. Based on the technology used by $N_0$ and its hinge communication nodes the value of $E_{RO}$ cannot be over-stated by the initiator $N_0$. The technologies in used by the hinge communication nodes can be validated by the first smart contract by checking into hinge communication nodes' VID/DID in the ledger.

This progressive positioning system will become most successful if certain commercially-valued credit, or fund, goes from the communication node successfully obtained an AM Level-Up to those participating hinge communication nodes with higher AM grades. This encourages the willingness of higher accuracy nodes to contribute. If the incentive is big enough, mobile communication nodes with better inertial navigation algorithms, more accurate assessment skills to GNSS signals and more accurate telemetry methods will be made available. These will only help to improve the effectiveness and popularity of this progressive positioning system. As is shown in FIG. 5, upon acknowledgement of an AM Level-Up exercise, as part of the smart contract, credit or fund is released from communication nodes $N_0$ to contributing communication nodes $N_A$, $N_B$, and $N_C$ with pre-defined rules.

In summary, a relative positioning algorithm event that benefits the communication node $N_0$ to obtain geographic coordinate with higher accuracy merits triggers the execution of a first smart contract (as shown in FIG. 5) in a blockchain. The terms of acceptance of this smart contract include 1) the first hinge communication node's geographic coordinate and accuracy merits pre-exists in a blockchain ledger and 2) the obtained geographic coordinate and accuracy merit can be judged to meet physical and mathematical limitations, according to the calculating information of the relative positioning algorithm submitted by the communication node, and geographic coordinate and accuracy merit data as logged by the ledger. The first smart contract can judge by physical limitations known to the industry, or more specifically by VID/DID if that is available. The mathematical limitations encompass factors included in the calculation of $E_{CO} = \overline{E_{Ci}} + \overline{E_{Ri}}$. The smart contract can judge by the fact that the uncertainties of an initiator communication node cannot be better than its hinge communication node, for example. The mathematical limitations further encompass limitations in statistical means in use, as can be judged for example by the number of samples in consideration and over how long measurement time period. The acceptance of the smart contract then generates a record in the ledger including the resulting geographic coordinate and accuracy merit. According to the nature of the smart contracts, even if the terms of acceptance are not satisfied, the ledger will still generate corresponding records including the unique IDs of the participating communication nodes. Optionally the amount of credit the benefited communication node $N_0$ delivered to the second hinge communication node is also recorded in the ledger. Communication node $N_0$ can learn whether there is an acceptance so that its coordinate and accuracy merit can be updated, either from the API of the first smart contract or from the ledger. With these steps communication node $N_0$ obtained a coordinate with a less uncertainty, that is, the first smart contract on the service cloud recalibrated a communication node $N_0$'s coordinate. In brief, in case a relative positioning algorithm event that benefits the communication node $N_0$ to obtain geographic coordinate with higher accuracy merits, communication node $N_0$ submits the calculation information of the relative positioning algorithm to a blockchain to initiate the execution of a first smart contract in the blockchain. The term of acceptance includes the first hinge communication nodes $N_A$, $N_B$ and $N_C$'s geographic coordinates and accuracy merits pre-existing in the ledger of the blockchain and the obtained geographic coordinate and accuracy merit being judged to meet physical and mathematical limitations according to the calculation information of the relative positioning algorithm submitted by the communication node $N_0$ and geographic coordinate and accuracy merit data of the first hinge communication node $N_A$, $N_B$ and $N_C$ as logged by the ledger. The ledger of the blockchain records the geographic coordinate and the accuracy merit obtained by the communication node $N_0$ after the term of acceptance of the first smart contract is satisfied.

Steps S51: communication node $N_0$ submits the coordinates and accuracy merits before and after trilateration exercise, base of reasoning of the new AM, and unique IDs of communication node $N_0$ and first hinge communication nodes $N_A$, $N_B$ and $N_C$ to the first smart contract. Go to Step S52.

Step S52: the first smart contract receives the information above and judges whether terms of acceptance are satisfied. If yes, go to Step S53. If no, go to Step S521. The terms of acceptance include: past coordinate/AM records for $N_A$, $N_B$ and $N_C$ are valid and base of reasoning for new AM is valid.

Step S521: the first smart contract rejects communication node $N_0$'s request for AM Level-Up.

Step S53: the first smart contract accepts communication node $N_O$'s request for AM Level-Up and includes communication node $N_O$'s coordinate and accuracy merit in the blockchain's distributed ledger. Fund is released from communication nodes $N_O$ to first hinge communication nodes $N_A$, $N_B$, and $N_C$. Go to Step S54.

Step S54: communication node $N_O$ updates its coordinate and accuracy merit.

In the Ethereum blockchain platform, each executed smart contract is identifiable by the initiator's public key. Past transactions can be searched and reviewed on the public ledger. The per transaction information included in the ledger includes but is not limited to participating communication nodes' IDs, $N_O$'s coordinates, AM grade, time of execution, VID/DID, and credit delivered. This facilitates a communication node to check in advance whether a new hinge communication node is trustful. The execution of the relative positioning algorithm, and the AM Level-Up request to the smart contract can be totally skipped if a communication node is not trustful, to save the resources. In Ethereum Explorer either a transaction hash or an address hash can be used to search for executed smart contract. The address is a unique value converted from the unique public key and will not duplicate, and the conversion rule is publicly known. That is, the record in the blockchain's ledger includes the unique IDs of the communication node and the first hinge communication node. When a relative positioning algorithm exercise is performed, a communication node can obtain the geographic coordinate and the accuracy merit of a hinge communication node from the ledger of the blockchain according to the unique ID of the hinge communication node so as to carry out the relative positioning algorithm.

For communication nodes deep in a building, or tunnel, without any geographic survey, the communication nodes count on neighboring hinge communication nodes to carry out trilateration measurement. Neighboring nodes again could be hinged by others. In this case uncertainties accumulate as addition in $E_{CO}=\overline{E_{Ci}}+\overline{E_{Ri}}$ are carried out multiple times. AM grades will take longer to stabilize and statistical means is crucial. Using the blockchain technology to validate any AM Level-Up becomes more important to avoid any deceptive node in between and to ensure the reliability.

As stated previously, radio links among communication nodes may either be 1-way or 2-ways. The 802.11mc protocols can be carried out without network association and coordinates and distances can be exchanged among communication nodes. Parameters not included in the standard, such as Accuracy Merit and the Public Key, can either be passed through the Location Civic Report frames, or by network association. Alternatively, since the ledger can be accessed publicly, as long as the unique public key (unique ID) of a hinge communication node is made available, its geographic coordinate and AM can be obtained via the ledger in the cloud, avoiding a local IP network association. This also facilitates the initiator's confirmation check in case of any doubt.

Again as just explained, the geographic coordinate and the accuracy merit of either the first or the second hinge communication node can be obtained from the ledger of the blockchain. On most blockchain platforms the ledger is a publicly searchable database. With the hinge communication node's unique ID, a hinge communication node's latest geographic coordinate, accuracy merit and the effective time/date become instantly available, if requested by an initiator. Since a communication node's unique ID can be broadcast publicly via SSID (or Bluetooth beacon) or in LCR, querying ledger becomes a very power tool in the sense that multiple telemetry methods can now co-exist. An initiator communication node, such as a smartphone or simply a regular AP communication node, can use mixed telemetry means among signal strength, FTM, UWB, LiDAR or the like to measure distances to neighboring hinge communication nodes while obtaining those communication nodes' geographic coordinates from the ledger, in order to obtain its geographic coordinate via trilateration. If a hinge communication node is unable to broadcast its unique ID as its SSID (or Bluetooth beacon) publicly, a conversion server can still be used to convert the SSID to its unique ID. In a small area (for example, according to the location of the initiator's communication node), an SSID or Bluetooth beacon database can be established to relate to a communication node's unique ID. Optionally the communication node's MAC address can be used in association with SSIDs or Bluetooth beacons if there is concern of duplication.

In FIG. 2, as was explained earlier a location data consumer (here a smartphone) enters a space where multiple hinge communication nodes are installed and enabled with coordinates with certain AM grades. The smartphone obtains its set of coordinates with an AM at a lower grade than the hinge communication nodes, due to uncertainties in distance measurement. Location data consumptions with low AM levels usually introduce no or insignificant exchange of credit. However, the smartphone can also submit the calculation information of the relative positioning algorithm to a blockchain to trigger the execution of the first smart contract of the blockchain and to include its geographic coordinates and accuracy merit in the ledger. As mentioned earlier, this smart phone can also be used as a temporary hinge communication node when necessary.

A communication node may achieve a high AM grade after multiple relative positioning exercises. However the system is designed to be a globally accessible peer positioning service for all. A stationary communication node shall not "move" or the AM grade must be rescinded. The firmware must be designed so that a change in location is detectable. For super high precision communication node hardware detection may be needed. The communication node can compare IDs, coordinates of and distances to peer communication nodes nearby against past history, occasionally or after a power down, to confirm whether it is stationary. If there is a distance change significantly greater than $E_R$, the evidence that the communication node has been moved becomes clear. When this happens the firmware needs to trigger the execution of the first smart contract to obtain new geographic coordinates and accuracy merit, and to invalidate the previous geographic coordinates and accuracy in the ledger.

There are GPS signal generators that may be used to create fake GPS coordinates. To avoid misrepresentation, the rule can be defined so that any GPS presence must be validated by other co-exiting communication nodes with good AM standings, in an AM Level-Up validation process.

For a location where the GPS works, an amateur geographic surveyor can count on a smart phone to refer to the GoogleMap® coordinates to mark the geographic coordinates of a hinge communication node. The smartphone application can look into the validity of the GPS reading and the radio link against the hinge communication node to obtain a minimum credibility for its validity. There are literatures that teach how to properly learn a GPS reading's error range. Table 1 can then be used to convert to the accuracy merit for this hinge communication node. In addition to GPS, the geographic coordinates obtained by other positioning systems can also be used as reference hinge communication nodes if they can all be similarly validated. For such amateur-enabled hinge communication nodes, a "probation" mechanism can be used. For example, the new communication node must be able to execute a trilateration exercise with a first smart contract-validated communication node nearby in association with a smart phone, so that an AM grade can be assessed. In this case, because GPS and other positioning systems have no previous records in the ledger, the first smart contract can only count on smart contract-validated communication nodes and the credibility of the smart phone's application to judge for creditability. By doing so this new communication node is approved by the smart contract with certain initial AM grade, which improves as more smart contract-validated communication nodes become peer communication nodes and the trilateration measurements are stable over time. By the same marking-by-a-GPS-coordinate mechanism the geographic coordinates of a legacy WiFi AP without a relative positioning algorithm firmware can be turned into a "quasi" hinge communication node. Once its SSID is set to show its unique ID, it well represents its geographic location and AM which is readable from the public ledger. Comparing to a regular hinge communication node, it is capable of showing its location and AM. It is just not capable of initiating telemetry measurement against peer communication nodes. These legacy WiFi AP-converted quasi hinge communication nodes can use the same "probation" mechanism to obtain higher accuracy merits. However the accuracy merit won't be great due to their limited distance measurement capabilities.

The design of this service must include certain hinge communication nodes that are able to obtain their geospatial position in high precision through survey. This kind of "external positioning resources" may include geographic survey, positioning via GNSS or other positioning systems. For a communication node with professional or amateur survey coordinate input, a special second smart contract intended for a "reference hinge node" or a "super hinge node" can be enabled, under a more supervised mechanism, creating a level of AM grade in compatible with the uncertainty of the external resource. The term of acceptance for this second smart contract must therefore include a certifiable signatory or warranty. Practically in a blockchain a certifiable signature can be achieved by restricted access control of the smart contract, or by using a multi-signature contract ("multisig") in which multiple signatures from different addresses are needed for a transaction to be executed. That is, when any one of communication nodes obtains its geographic coordinate and the accuracy merit from an external survey resource, the communication node submits the geographic coordinate and the accuracy merit thereof along with a certifiable signatory to the blockchain to initiate a second smart contract in the blockchain. The term of acceptance of the second smart contract includes the certifiable signatory of the external survey resource. Moreover, the ledger of the blockchain records the geographic coordinate and the accuracy merit obtained by the communication node after the term of acceptance of the second smart contract is satisfied.

The first and second smart contracts can alternatively be run by computer programs that include a section of validation codes, typically available from a cloud server. For example, a relative positioning algorithm is carried out by communication node $N_O$ and the first hinge communication nodes $N_A$, $N_B$, and $N_C$. The communication node $N_O$ submits the calculation information of the relative positioning exercise to a first validation program, if a geographic coordinate obtained by bears a better accuracy merit, The acceptance terms for the first validation program include 1) first hinge communication nodes $N_A$, $N_B$, and $N_C$ pre-exist in the log of the first validation program, and 2) the obtained geographic coordinate and accuracy merit can be judged to meet physical and mathematical limitations, according to the calculation information of the relative positioning algorithm submitted by the communication node and geographic coordinate and accuracy merit data as logged by the first validation program. In addition, the log of the first validation program records the geographic coordinate and the accuracy merit obtained by the communication node after the term of acceptance of the first validation program is satisfied. Optionally the amount of credit the communication node benefited $N_O$ delivered to the second hinge communication node is also recorded in the log. Furthermore, any communication node, e.g. communication node $N_O$, may obtain its geographic coordinate and accuracy merit from an external source. Communication node $N_O$ can therefore submit the obtained geographic coordinate and accuracy merit along with its certifiable signature to a second validation program. The log of the first validation program records the geographic coordinate and the accuracy merit obtained by the communication node after the term of acceptance of the second validation program is satisfied.

Figure 6A:
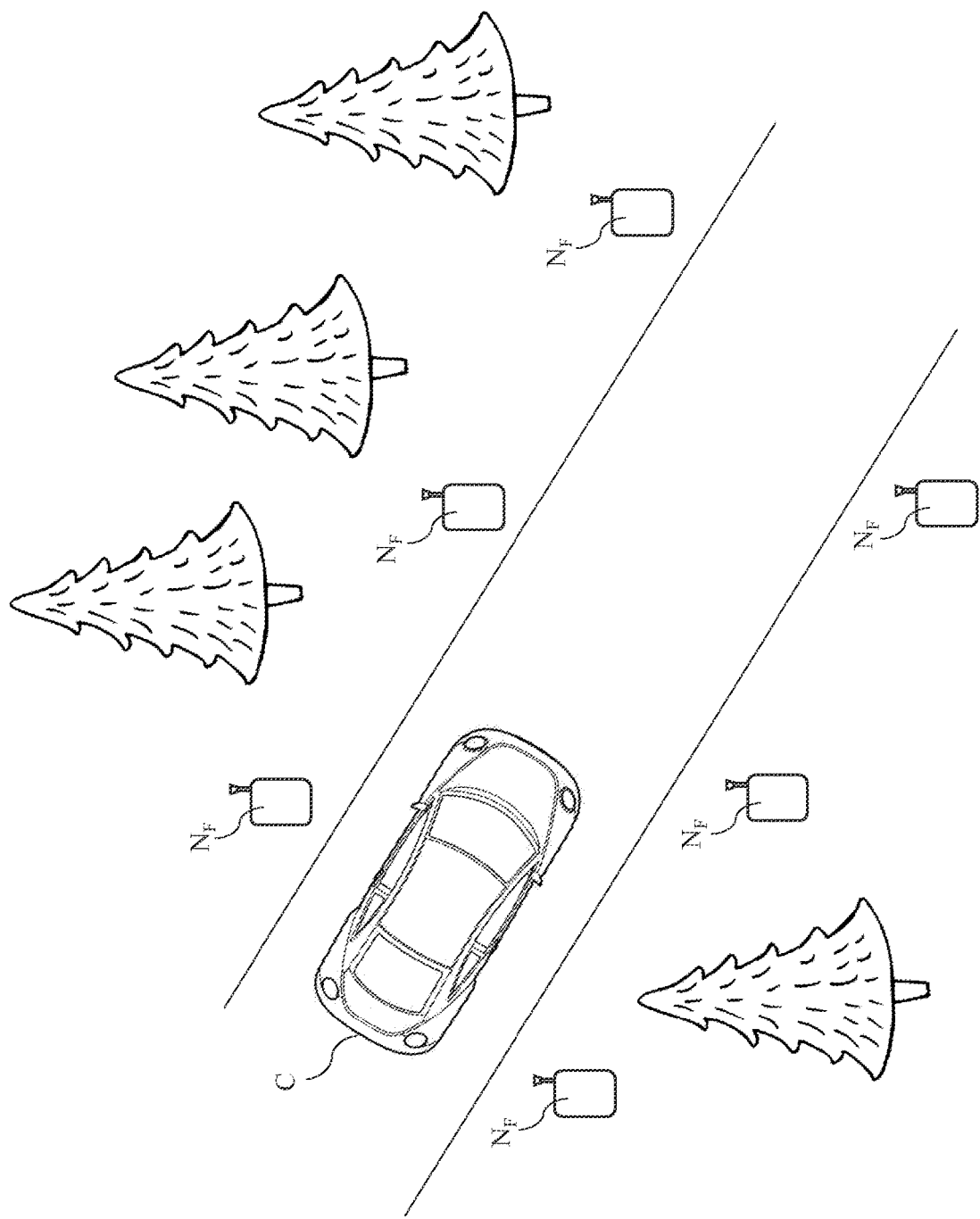
FIGS. 6A and 6B depict the application of this positioning method to a space inside a vehicle.
Figure 6B:
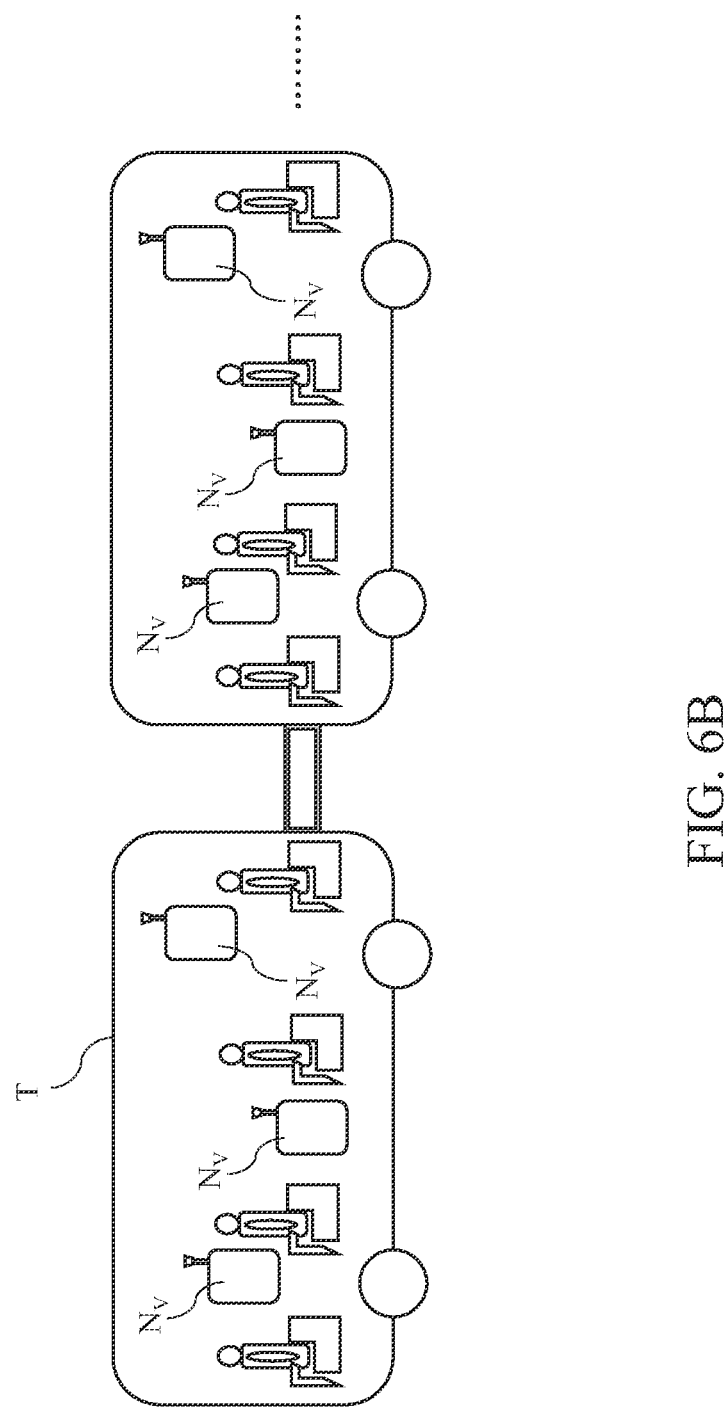

FIGS. 6A and 6B depict the application of this positioning method to a space inside a vehicle. A plurality of communication nodes $N_V$ are to be installed on a vehicle. These communication nodes $N_V$ not only obtain their coordinates, on the fly when the vehicle moves, but also act as the hinge communication nodes to position consumers inside the vehicle. A plurality of "vehicle communication nodes" $N_V$ are installed on a train T, a bus or a car C. They carry out the same relative positioning algorithm against stationary hinge communication nodes $N_F$ (first hinge communication nodes) by roadside, obtaining their absolute coordinates and AMs. Afterward they act as the hinge communication nodes for gadgets on board the vehicle, to facilitate their position data consumption. This way even without GPS or internet connection the gadgets on board the vehicle get to know their precise locations. An app on the gadget (a smartphone) can not only count on the absolute position to identify its location on a geographic map, but also gets to know its reference location in this vehicle. A passenger can therefore be guided to a seat or to a moving train conductor, as some examples. Inertial motion sensors (e.g. accelerometer and gyroscope) data collected on the vehicle can further be used to improve the precision of the absolute coordinates for the vehicle communication nodes $N_V$. This is done with a known trajectory of the vehicle and the previous known position at the starting point of the trajectory. With this type of inertial navigation assistance the vehicle communication nodes continues to provide services even if stationary hinge communication nodes by roadside are temporarily unavailable. That is, a plurality of communication nodes are distributed over a space and inside a moving vehicle while the first hinge communication nodes are stationary and not inside the moving vehicle. The communication nodes not only determine their geographic coordinates and accuracy merits via performing a relative positioning algorithm, but also participate in relative positioning algorithm executed by mobile devices inside the vehicle.

Another aspect of this invention relates to communication nodes on board a vehicle for collision avoidance. It is proposed that neighboring vehicles on the road be installed with the vehicle communication nodes $N_V$ onboard. Inter vehicle telemetry is conducted to find relative positions among moving vehicles. With less radio obstruction in between and less signal attenuation in short ranges, higher relative positioning precision in a short period of collaborating exercise time is possible. A collision avoidance mechanism can be designed amongst the vehicles, with or without internet connection. In case an IEEE802.11ax WiFi is used for this collision avoidance network, the latency can be as low as 7.6 mS with OFDMA and the vehicle's response precision will be in sub-meter even when moving at a speed of 70 Km/h.

Another aspect of this invention relates to the application in proximity awareness. A communication node participated in the relative positioning algorithm can also include an actuator to trigger the motion of an object. This will be useful for the access control to a building, for example. The steps are as follows. As a mobile communication node (such as a smartphone) approaches the building, the building's access control hinge communication node which includes an actuator asks for identification. The mobile communication node can now encrypt a meaningful plain text such as "This is James" by its private key. By this time the hinge communication node can decrypt the encrypted message into a recognizable plain text and therefore get to know the identity of the mobile communication node by using the mobile communication node's public key (the unique ID). Conversely, the hinge communication node will never decrypt an encrypted message into a recognizable text if the encrypted message was sent by a malicious communication node without knowing the private key of the genuine communication node but falsely identifying itself with the genuine communication node's public key. This is how the digital cryptography works. With the mobile communication node's unique ID, the hinge communication node recognizes the user's identity and triggers the actuator to allow for entrance. The mobile communication node, if installed in a car and is holding a recognizable public key, can equally be used to gain access to a parking lot in a similar way. The actuator is used to open the gate of the building or parking lot. The action for the hinge communication node to ask for identification and the action for the mobile communication node to deliver the encrypted message are not part of the one-way broadcast and two-way RTT measurement usually used in a typical trilateration. However they can be carried out either by using the LCR frame or via IP connections. That is, one of the communication nodes participated in the relative positioning algorithm includes an actuator. When the communication node with the actuator obtains the identity of a mobile communication node by using the mobile communication node's unique ID to decrypt a message encrypted by the mobile communication node's private key according to a digital cryptography, the communication node determines whether to activate the actuator to control a controlled device according to the identity of the mobile communication node.

Figure 7:
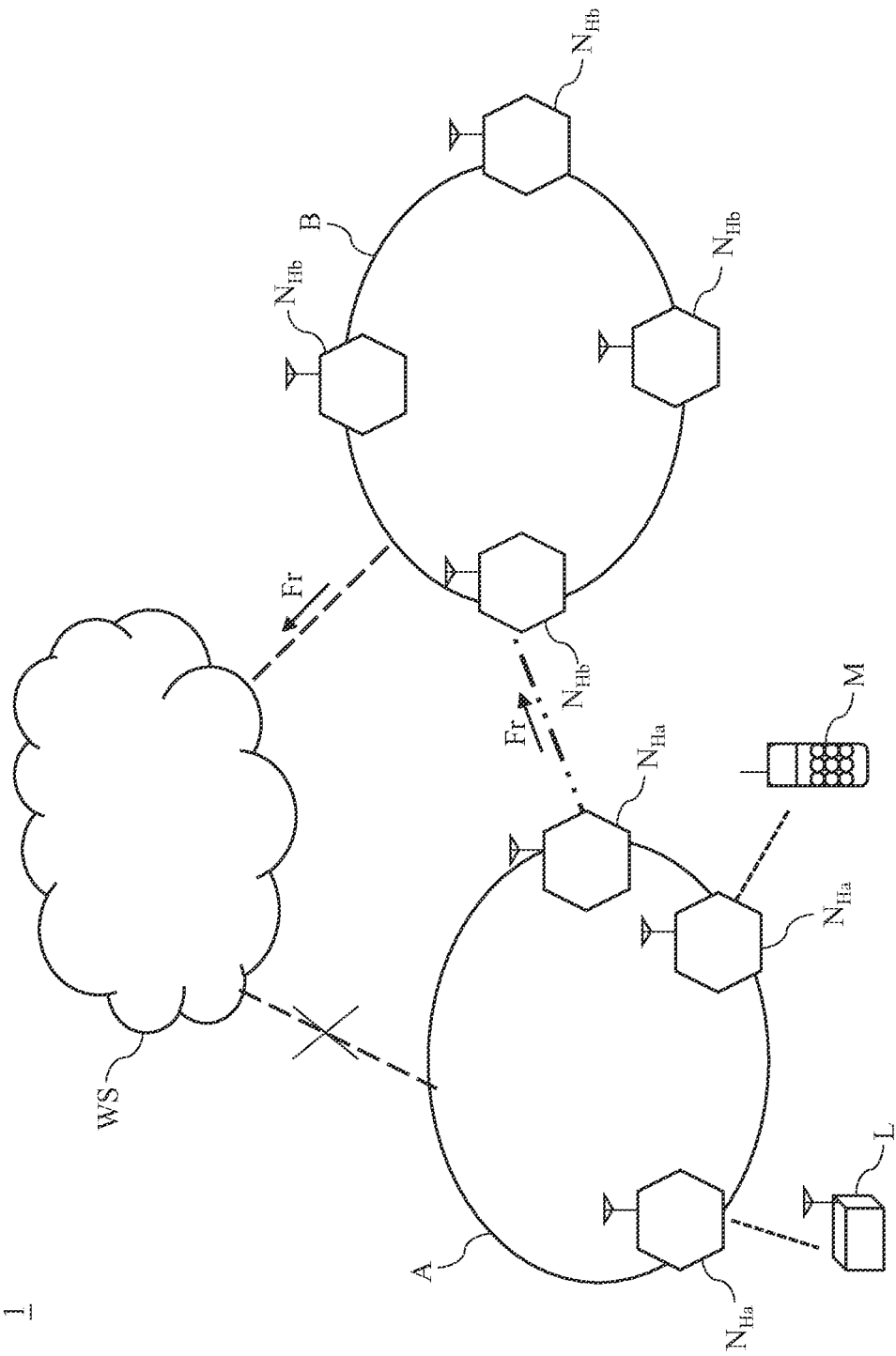
FIG. 7 explains how applications can be extended to high availability and security use cases.

FIG. 7 explains how applications can be extended to high availability and security use cases. By consent neighboring communication nodes get to exchange information further than geographic coordinates and AMs with each other by recognizing the other party's unique public key. Message deliveries among peer communication nodes are not part of the one-way broadcast and two-way RTT measurement usually used in a typical trilateration. However they can be carried out either by using the LCR frame or via IP connections. An alerting communication node such as a user in distress holding a mobile phone M or a lost luggage L equipped with a BLE (Bluetooth Low Energy) tag enters an area served by peer Group A. This Group A consists of a few communication nodes $N_{Ha}$, some of them including Bluetooth bridges. An alert Fr, encrypted, can be passed to another communication node $N_{Hb}$ (within radio range) in Group B and be passed to an alert server WS in the internet, even if the internet connection for Group A is down. Using neighboring communication nodes (such as communication nodes $N_{Ha}$ and $N_{Hb}$ in the figure) is useful for system reliability, high availability and security considerations. One communication node $N_{Ha}$ can bypass its regular internet connection and with a neighboring communication node $N_{Hb}$'s aid to report a connection outage, an alert or emergency distress signal, if the alert Fr does indicate the destination of the alert message. The disappearance of a neighboring communication node in a high AM grade may also constitute an alert. Location data or the ID of the alerting communication node can also be forwarded if location is a critical part of the alert. Battery operated BLE-enabled communication nodes are well-suited in a power outage to maintain an alerting status over a significant period of time. Lost items, if equipped with firmware that can join as a peer communication node, may be found in a covert way. That is, one of the communication nodes participated in the relative positioning algorithm (such as one in Group A) can deliver the alert Fr of one alerting communication node (such as the mobile phone M or the lost luggage L) to another communication node (such as one in Group B), or a remote site on the internet as assigned by the alerting communication node.

The alert Fr can be designed to proclaim an undeniable proof of existence at a location. In FIG. 7 a communication node in Group B, or one in Group A if Group A does maintain its internet connection, may elect to trigger a relative positioning algorithm and a "null" execution of the AM Level-Up smart contract upon sensing an alert. The intention of the request is not to obtain an acceptance of the smart contract because no new hinge communication node of better AM grade exists. It is rather designed to maintain a record in the ledger earmarking the time it co-exists with the device on alert. Multiple communication nodes may be needed to carry out relative positioning algorithm and the "null" AM Level-Up smart contract request so that the device on alert at least participates in one of them. Since the record in the ledger is undeniable, the location of the device on alert at that particular time is undeniable. In case the alert Fr include the unique ID of the device on alert, the recipient of the alert Fr get to know the undeniable geographic coordinates of the device on alert per a precise time, as can be found from the ledger.

It will be apparent to those skilled in the art that various modifications and variations can be made to the disclosed exemplary embodiments. It is intended that the specification and examples be considered as exemplary only, with a true scope of the disclosure being indicated by the following claims and their equivalents. In particular, any computer program running on the internet, with judgment capability related to whether the obtained geographic coordinate and accuracy merit meet physical and mathematical limitations, similar to the smart contract in a blockchain; and creating a log after an AM Level-Up and recording geographic coordinates before and after, similar to the ledger in a blockchain, is covered by the related claims hereafter, no matter whether it runs on a blockchain platform or not.

What is claimed is:

1. A progressive global positioning system, comprising:
    a plurality of communication nodes having respective geographic coordinates and accuracy merits, distributed over a space and adjacent to one another; and a first hinge communication node having a respective geographic coordinate and an accuracy merit, wherein the first hinge communication node is adjacent to the communication nodes;

wherein at least one of the plurality of communication nodes performs a relative positioning algorithm with the first hinge communication node to determine the geographic coordinate and the accuracy merit of the at least one communication node;

wherein the at least one communication node performing the relative positioning algorithm and obtaining the geographic coordinate with the accuracy merit submits a calculation information of the relative positioning algorithm to a blockchain to initiate an execution of a first smart contract in the blockchain, the calculation information including the geographical coordinates and accuracy merit of the at least one communication node before and after the relative positioning algorithm;

wherein a term of acceptance of the first smart contract includes the geographic coordinate and the accuracy merit of the first hinge communication node pre-existing in a ledger of the blockchain, and the geographic coordinate and the accuracy merit obtained by the at least one communication node is judged to meet physical and mathematical limitations according to the calculation information of the relative positioning algorithm submitted by the at least one communication node and the geographic coordinate and the accuracy merit of the first hinge communication node in the ledger of the blockchain;

wherein the ledger of the blockchain records the geographic coordinate and the accuracy merit obtained by the at least one communication node after the term of acceptance of the first smart contract is satisfied.

2. The progressive global positioning system of claim 1, further comprising a second hinge communication node with a respective geographic coordinate and a respective accuracy merit, the second hinge communication node communicatively adjacent to the at least one communication node;

wherein when the communication node and the second hinge communication node perform the relative positioning algorithm again to calculate the geographic coordinate and the accuracy merit of the at least one communication node, the at least one communication node compares the geographic coordinate and the accuracy merit of the at least one communication node with the geographic coordinate and the accuracy merit obtained previously, and adopts the geographic coordinate having the higher associated accuracy merit.

3. The progressive global positioning system of claim 1, wherein when any one of the communication nodes obtains the geographic coordinate and the accuracy merit from an external survey resource, the at least one communication node submits the geographic coordinate and the accuracy merit along with a certifiable signatory to the blockchain to initiate a second smart contract in the blockchain, wherein a term of acceptance of the second smart contract includes the certifiable signatory of the external survey resource, wherein the ledger of the blockchain records the geographic coordinate and the accuracy merit obtained by the at least one communication node after the term of acceptance of the second smart contract is satisfied.

4. The progressive global positioning system of claim 1, wherein the ledger of the blockchain comprises unique identifiers of the at least one communication node and the first hinge communication node.

5. The progressive global positioning system of claim 1, wherein the at least one communication node obtains the geographic coordinate and the accuracy merit of the first hinge communication node from the ledger of the blockchain according to the unique identifier of the first hinge communication node so as to carry out the relative positioning algorithm.

6. A progressive global positioning system comprising:
a plurality of communication nodes having geographic coordinates and accuracy merits, the communication nodes distributed over a space and adjacent to one another; and
a first hinge communication node having a geographic coordinate and an accuracy merit, the first hinge communication node adjacent to the communication nodes;
wherein at least one of the plurality of communication nodes performs a relative positioning algorithm with the first hinge communication node to determine the geographic coordinate and the accuracy merit of the at least one communication node;
wherein the at least one communication node performing the relative positioning algorithm and obtaining the geographic coordinate with a higher accuracy merit submits a calculation information of the relative positioning algorithm to a first validation program, wherein a term of acceptance of the first validation program includes the geographic coordinate and the accuracy merit of the first hinge communication node pre-existing in a log of the first validation program, and the geographic coordinate and the accuracy merit obtained by the at least one communication node being judged to meet physical and mathematical limitations according to the calculation information of the relative positioning algorithm submitted by the at least one communication node and the geographic coordinate and the accuracy merit of the first hinge communication node as logged by the log of the first validation program, the calculation information including the geographical coordinates and accuracy merit of the at least one communication node before and after the relative positioning algorithm;
wherein the log of the first validation program records the geographic coordinate and the accuracy merit obtained by the at least one communication node after the term of acceptance of the first validation program is satisfied.

7. The progressive global positioning system of claim 6, wherein when any one of the communication nodes obtains the geographic coordinate and the accuracy merit thereof from an external survey resource, the communication node submits the geographic coordinate and the accuracy merit of the at least one communication node along with a certifiable signatory to a second validation program, wherein a term of acceptance of the second validation program includes the certifiable signatory of the external survey resource, wherein the log of the first validation program records the geographic coordinate and the accuracy merit obtained by the at least one communication node after the term of acceptance of the second validation program is satisfied.

8. The progressive global positioning system of claim 1, wherein each of the at least one communication nodes calculates a respective accuracy merit according to a plurality of error factors, wherein the error factors comprise the accuracy merit of the first hinge communication node, and an uncertainty of a distance between the at least one communication node and the first hinge communication node obtained by the at least one communication node via the relative positioning algorithm.

9. The progressive global positioning system of claim 8, wherein each of the communication nodes performs a statistical analysis according to a historical geographic coordinate of the at least one communication node in order to improve the geographic coordinate and the accuracy merit of the at least one communication node.

10. The progressive global positioning system of claim 1, wherein at least one of the communication nodes is a mobile device and the mobile device delivers the geographic coordinate of the mobile device to another application to display the geographic coordinate of the mobile device, or to a tracking server, wherein the tracking server provides the geographic coordinate of the mobile device for another electronic device.

11. The progressive global positioning system of claim 1, further comprising an alerting communication node, wherein the at least one communication node that participated in the relative positioning algorithm delivers an alert of the alerting communication node to another communication node of the plurality of communication nodes, or a remote site on an internet as assigned by the alerting communication node.

12. The progressive global positioning system of claim 1, further comprising an actuator and a mobile communication node, wherein when the at least one communication node that participated in the relative positioning algorithm includes the actuator and the at least one communication node obtains an identity of the mobile communication node by using the unique identifier of the mobile communication node to decrypt a message encrypted using a private key of the mobile communication node according to a digital cryptography, wherein the at least one communication node determines whether to activate the actuator to control a controlled device according to the identity of the mobile communication node.

13. The progressive global positioning system of claim 1, wherein the plurality of communication nodes are distributed over a space inside a moving vehicle and the first hinge communication node is stationary and not inside the moving vehicle, wherein the plurality of communication nodes not only determine the geographic coordinates and the accuracy merits via performing the relative positioning algorithm with one another, but also participate in the relative positioning algorithm executed by a mobile device inside the vehicle.

14. A progressive global positioning method, comprising:
distributing a plurality of communication nodes bearing geographic coordinates and accuracy merits over a space, wherein the communication nodes are adjacent to one another;
performing a relative positioning algorithm by at least one of the communication nodes, intending to determine the geographic coordinate and the accuracy merit thereof, and a first hinge communication node for the communication node to determine the geographic coordinate and the accuracy merit thereof, wherein the first hinge communication node bears a geographic coordinate and an accuracy merit and is adjacent to the communication nodes, wherein the at least one communication node performing the relative positioning algorithm obtains the geographic coordinate with a higher accuracy merit due to the relative positioning algorithm; and
submitting a calculation information of the relative positioning algorithm to a blockchain to initiate an execution of a first smart contract in the blockchain by the at least one communication node, the calculation information including the geographical coordinates and accuracy merit of the at least one communication node before and after the relative positioning algorithm;
wherein a term of acceptance of the first smart contract includes the geographic coordinate and the accuracy merit of the first hinge communication node pre-existing in a ledger of the blockchain, and the geographic coordinate and the accuracy merit obtained by the at least one communication node is judged to meet physical and mathematical limitations according to the calculation information of the relative positioning algorithm submitted by the at least one communication node and the geographic coordinate and the accuracy merit of the first hinge communication node in the ledger of the blockchain; and
wherein the ledger of the blockchain records the geographic coordinate and the accuracy merit obtained by the communication node after the term of acceptance of the first smart contract is satisfied.

15. The progressive global positioning method of claim 14, further comprising:
when the at least one communication node and a second hinge communication node with a geographic coordinate and an accuracy merit perform the relative positioning algorithm again to calculate the geographic coordinate and the accuracy merit of the at least one communication node, comparing the geographic coordinate and the accuracy merit of the at least one communication node with the geographic coordinate and the accuracy merit obtained previously, and adopting the geographic coordinate having the higher associated accuracy merit.

16. The progressive global positioning method of claim 14, wherein when any one of the communication nodes obtains the geographic coordinate and the accuracy merit from an external survey resource, the at least one communication node submits the geographic coordinate and the accuracy merit along with a certifiable signatory to the blockchain to initiate a second smart contract in the blockchain, wherein a term of acceptance of the second smart contract includes the certifiable signatory of the external survey resource, wherein the ledger of the blockchain records the geographic coordinate and the accuracy merit obtained by the at least one communication node after the term of acceptance of the second smart contract is satisfied.

17. The progressive global positioning method of claim 14, wherein the ledger of the blockchain comprises unique identifiers of the at least one communication node and the first hinge communication node.

18. The progressive global positioning method of claim 14, wherein the at least one communication node obtains the geographic coordinate and the accuracy merit of the first hinge communication node from the ledger of the blockchain according to the unique identifier of the first hinge communication node so as to carry out the relative positioning algorithm.

19. A progressive global positioning method comprising:
distributing a plurality of communication nodes having geographic coordinates and accuracy merits over a space, the communication nodes adjacent to one another;
performing a relative positioning algorithm by at least one of the communication nodes and a first hinge communication node to determine the geographic coordinate and the accuracy merit of the at least one communication node, the first hinge communication node having a geographic coordinate and accuracy merit and is adjacent to the plurality of communication nodes, wherein the at least one communication node performing the relative positioning algorithm obtains the geographic coordinate with a higher accuracy merit; and submitting a calculation information of the relative positioning algorithm to a first validation program by the at least one communication node, wherein a term of acceptance of the first validation program includes the geographic coordinate and the accuracy merit of the first hinge communication node pre-existing in a log of the first validation program, and the geographic coordinate and the accuracy merit obtained by the at least one communication node being judged to meet physical and mathematical limitations according to the calculation information of the relative positioning algorithm submitted by the at least one communication node and the geographic coordinate and the accuracy merit of the first hinge communication node as logged by the log of the first validation program, the calculation information including the geographical coordinates and accuracy merit of the at least one communication node before and after the relative positioning algorithm; and wherein the log of the first validation program records the geographic coordinate and the accuracy merit obtained by the at least one communication node after the term of acceptance of the first validation program is satisfied.

20. The progressive global positioning method of claim 19, wherein when any one of the communication nodes obtains the geographic coordinate and the accuracy merit of the at least one communication node from an external survey resource, the at least one communication node submits the geographic coordinate and the accuracy merit of the at least one communication node along with a certifiable signatory to a second validation program, wherein a term of acceptance of the second validation program includes the certifiable signatory of the external survey resource, wherein the log of the first validation program records the geographic coordinate and the accuracy merit obtained by the at least one communication node after the term of acceptance of the second validation program is satisfied.

21. The progressive global positioning method of claim 14, further comprising:

calculating the respective accuracy merit of the at least one communication node according to a plurality of error factors by each of the communication nodes, wherein the error factors comprise the accuracy merit of the first hinge communication node, and an uncertainty of a distance between the at least one communication node and the first hinge communication node obtained by the at least one communication node via the relative positioning algorithm.

22. The progressive global positioning method of claim 21, further comprising:

performing a statistical analysis by each of the communication nodes according to a historical geographic coordinate record of the communication node in order to improve the geographic coordinate and the accuracy merit of the at least one communication node.

23. The progressive global positioning method of claim 14, wherein at least one of the communication nodes is a mobile device and the mobile device delivers the geographic coordinate of the mobile device to another application to display the geographic coordinate of the mobile device, or to a tracking server, wherein the tracking server provides the geographic coordinate of the mobile device for another electronic device.

24. The progressive global positioning method of claim 14, further comprising:

delivering an alert of an alerting communication node to another communication node of the plurality of communication nodes, or a remote site on an internet as assigned by the alerting communication node by at least one of the communication nodes that participated in the relative positioning algorithm.

25. The progressive global positioning method of claim 14, further comprising:

when the at least one of the communication nodes that participated in the relative positioning algorithm includes an actuator and the at least one communication node obtains an identity of a mobile communication node by using an unique identifier of the mobile communication node to decrypt a message encrypted by a private key of the mobile communication node according to a digital cryptography, determining whether to activate the actuator to control a controlled device according to the identity of the mobile communication node by the at least one communication node.

26. The progressive global positioning method of claim 14, wherein the plurality of communication nodes are distributed over a space inside a moving vehicle and the first hinge communication node is stationary and not inside the moving vehicle, wherein the plurality of communication nodes not only determine the geographic coordinates and the accuracy merits via performing the relative positioning algorithm with one another, but also participate in the relative positioning algorithm executed by a mobile device inside the vehicle.

* * * * *